United States Patent
Xu et al.

(10) Patent No.: US 11,860,294 B2
(45) Date of Patent: Jan. 2, 2024

(54) ELECTROMAGNETIC VECTOR SENSORS FOR A SMART-DEVICE-BASED RADAR SYSTEM

(71) Applicant: Google LLC, Mountain View, CA (US)

(72) Inventors: Luzhou Xu, San Diego, CA (US); Jiang Zhu, Cupertino, CA (US); Jaime Lien, Mountain View, CA (US); David J. Weber, San Carlos, CA (US)

(73) Assignee: Google LLC, Mountain View, CA (US)

( * ) Notice: Subject to any disclaimer, the term of this patent is extended or adjusted under 35 U.S.C. 154(b) by 175 days.

(21) Appl. No.: 17/410,497

(22) Filed: Aug. 24, 2021

(65) Prior Publication Data

US 2022/0057476 A1 Feb. 24, 2022

Related U.S. Application Data

(60) Provisional application No. 63/069,654, filed on Aug. 24, 2020.

(51) Int. Cl.
   *G01S 7/02* (2006.01)
   *G01S 13/30* (2006.01)
   *G01S 13/87* (2006.01)

(52) U.S. Cl.
   CPC .............. *G01S 7/024* (2013.01); *G01S 13/30* (2013.01); *G01S 13/87* (2013.01)

(58) Field of Classification Search
   CPC ........... G01S 7/024; G01S 13/30; G01S 13/87
   See application file for complete search history.

(56) References Cited

U.S. PATENT DOCUMENTS 6,798,384 B2  9/2004 Aikawa et al.
8,552,920 B2  10/2013 Chung et al.
(Continued)

FOREIGN PATENT DOCUMENTS

CN   110907923   3/2020
KR   102095943   4/2020

OTHER PUBLICATIONS

"Automotive 77-GHz radar module reference design with object data output", http://www.ti.com/lit/ug/tidudq6/tidudq6.pdf?ts=1591381552080&ref_url=http://www.ti.com/tool/TIDA-01570, Dec. 2017, 19 pages.

(Continued)

*Primary Examiner* — Peter M Bythrow
*Assistant Examiner* — Nazra Nur Waheed
(74) *Attorney, Agent, or Firm* — Colby Nipper PLLC

(57) ABSTRACT

Techniques and apparatuses are described that implement electromagnetic vector sensors (EMVS) for a smart-device-based radar system. Instead of including an antenna array of similar antenna elements, the radar system includes two or more electromagnetic vector sensors. At least one of the electromagnetic vector sensors is used for transmission and at least another of the electromagnetic vector sensors is used for reception. Each electromagnetic vector sensor includes a group of antennas with different antenna patterns, orientations, and/or polarizations. An overall footprint of the two electromagnetic vector sensors (e.g., one for transmission and one for reception) can be smaller than antenna arrays used by other radar systems, thereby enabling the radar system to be implemented within space-constrained devices.

20 Claims, 15 Drawing Sheets

(56) References Cited

U.S. PATENT DOCUMENTS

| | | | |
|---|---|---|---|
| 2015/0130481 A1 | 5/2015 | Debray | |
| 2016/0327644 A1 | 11/2016 | Pu et al. | |
| 2017/0353338 A1 | 12/2017 | Amadjikpe et al. | |
| 2018/0175515 A1* | 6/2018 | Boutayeb | H01Q 21/30 |
| 2018/0342807 A1* | 11/2018 | Watson | H01Q 9/0421 |
| 2019/0020121 A1 | 1/2019 | Paulotto et al. | |
| 2019/0187247 A1* | 6/2019 | Izadian | G01S 7/025 |
| 2020/0072764 A1* | 3/2020 | Vacanti | G01N 22/00 |
| 2020/0280133 A1* | 9/2020 | Avser | H01Q 5/42 |

OTHER PUBLICATIONS

Fang, et al., "2D-DOD and 2D-DOA estimation using the electromagnetic vector sensors", Jun. 2018, pp. 163-172.

Kumjian, "Principles and Applications of Dual-Polarization Weather Radar. Part I: Description of the Polarimetric Radar Variables", http://nwafiles.nwas.org/jom/articles/2013/2013-JOM19/2013-JOM19.pdf, Aug. 2013, pp. 226-242.

Lee, et al., "High Frequency Vector Sensor Design and Testing", https://www.nrl.navy.mil/content_images/2013Review/13_ELECTRONICS.pdf, Jan. 2013, pp. 154-162.

Li, et al., "On parameter identifiability of MIMO radar", Dec. 2007, pp. 968-971.

Lien, et al., "Soli: Ubiquitous Gesture Sensing with Millimeter Wave Radar", ACM Transactions on Graphics (TOG), ACM, US, vol. 35, No. 4, XP058275791, ISSN: 0730-0301, DOI: 10.1145/2897824.2925953, Jul. 11, 2016, 19 pages.

Lim, et al., "Hydrometeor Classification System Using Dual-Polarization Radar Measurements: Model Improvements and In Situ Verifcation", Apr. 2005, pp. 792-801.

Nehorai, et al., "Vector-Sensor Array Processing for Electromagnetic Source Localization", Feb. 1994, pp. 376-398.

Prateek, et al., "Target Detection using Weather Radars and Electromagnetic Vector Sensors", Feb. 2017, pp. 387-397.

Xu, et al., "Target detection and parameter estimation for MIMO radar systems", Jul. 2008, pp. 927-939.

* cited by examiner

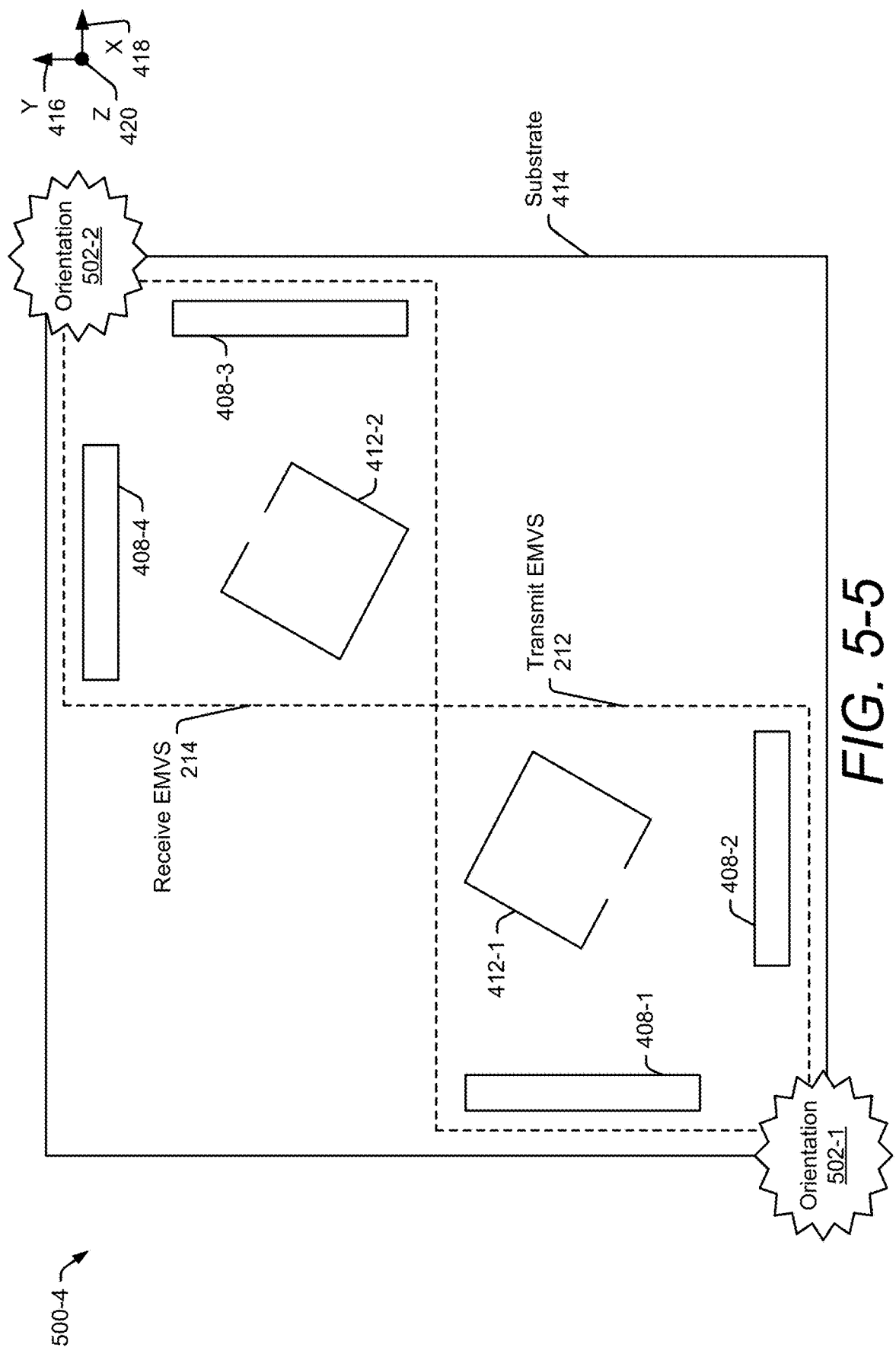

ELECTROMAGNETIC VECTOR SENSORS FOR A SMART-DEVICE-BASED RADAR SYSTEM

CROSS-REFERENCE TO RELATED APPLICATION

This application claims the benefit of U.S. Provisional Application No. 63/069,654, filed 24 Aug. 2020, the disclosure of which is hereby incorporated by reference in its entirety herein.

BACKGROUND

Radars are useful devices that can detect objects. Relative to other types of sensors, like a camera, a radar can provide improved performance in the presence of different environmental conditions, such as low lighting and fog, or with moving or overlapping objects. Radar can also detect objects through one or more occlusions, such as a purse or a pocket. While radar has may advantages, there are many challenges associated with integrating radar in electronic devices.

One such challenge involves restrictions that a small electronic device may impose on a radar's design. To satisfy size or layout constraints, for example, fewer antenna elements may be used to form an antenna array. Consequently, the reduced quantity of antenna elements can limit the angular resolution of the radar. With limited angular resolution, it can be challenging for the radar to achieve sufficient angular accuracies for some applications. As such, performance of a radar integrated within an electronic device may be significantly reduced. This can limit the types of applications the radar can support or the types of electronic devices that can incorporate the radar.

SUMMARY

Techniques and apparatuses are described that implement electromagnetic vector sensors (EMVS) for a smart-device-based radar system. Instead of including an antenna array of similar antenna elements, the radar system includes two or more electromagnetic vector sensors. At least one of the electromagnetic vector sensors is used for transmission and at least another of the electromagnetic vector sensors is used for reception. Each electromagnetic vector sensor includes a group of antennas with different antenna patterns, orientations, and/or polarizations. The various antenna patterns and polarizations of these antennas enable the radar system to perform angle estimation, object or material classification, and/or multipath interference rejection. An overall footprint of the two electromagnetic vector sensors (e.g., one for transmission and one for reception) can be smaller than antenna arrays used by other radar systems, thereby enabling the radar system to be implemented within space-constrained devices.

Aspects described below include a radar system for a smart device. The radar system includes a transmit electromagnetic vector sensor and a receive electromagnetic vector sensor. The transmit electromagnetic vector sensor includes at least two antennas and is configured to transmit, using a first antenna of the at least two antennas, a first radar transmit signal having a first linear polarization along a first axis. The transmit electromagnetic vector sensor is also configured to transmit, using a second antenna of the at least two antennas, a second radar transmit signal having a second linear polarization along a second axis that is orthogonal to the first axis. The receive electromagnetic vector sensor includes at least three antennas and is configured to receive, using a first antenna of the at least three antennas, a first radar receive signal having the first linear polarization. The receive electromagnetic vector sensor is also configured to receive, using a second antenna of the at least three antennas, a second radar receive signal having the second linear polarization. The receive electromagnetic vector sensor is additionally configured to receive, using a third antenna of the at least three antennas, a third radar receive signal having a third polarization that is different than the first linear polarization and the second linear polarization. The first radar receive signal, the second radar receive signal, and the third radar receive signal each comprise reflected versions of at least one of the first radar transmit signal or the second radar transmit signal.

Aspects described below include a method of operating a radar system with a transmit electromagnetic vector sensor and a receive electromagnetic vector sensor. The method includes transmitting, using a first antenna of the transmit electromagnetic vector sensor, a first radar transmit signal having a first linear polarization along a first axis. The method also includes transmitting, using a second antenna of the transmit electromagnetic vector sensor, a second radar transmit signal having a second linear polarization along a second axis that is orthogonal to the first axis. The method additionally includes receiving, using a first antenna of the receive electromagnetic vector sensor, a first radar receive signal having the first linear polarization. The method further includes receiving, using a second antenna of the receive electromagnetic vector sensor, a second radar receive signal having the second linear polarization. The method also includes receiving, using a third antenna of the receive electromagnetic vector sensor, a third radar receive signal having a third polarization that is different than the first linear polarization and the second linear polarization. The first radar receive signal, the second radar receive signal, and the third radar receive signal each comprise reflected versions of at least one of the first radar transmit signal or the second radar transmit signal.

Aspects described below also include a system with electromagnetic vector senor means for transmitting and receiving radar signals.

BRIEF DESCRIPTION OF DRAWINGS

Apparatuses for and techniques implementing electromagnetic vector sensors for a smart-device-based radar system are described with reference to the following drawings. The same numbers are used throughout the drawings to reference like features and components:

FIG. 4-1 illustrates components of an example electromagnetic vector sensor;

FIG. 4-2 illustrates an example implementation of a transmit or receive electromagnetic vector sensor;

FIG. 5-1 illustrates an example implementation of a transmit electromagnetic vector sensor and an example implementation of a receive electromagnetic vector sensor;

FIG. 5-2 illustrates an example implementation of a transmit electromagnetic vector sensor and an example implementation of a receive electromagnetic vector sensor positioned side-by-side with similar orientations;

FIG. 5-3 illustrates an example implementation of a transmit electromagnetic vector sensor and an example implementation of a receive electromagnetic vector sensor positioned side-by-side with different orientations;

FIG. 5-4 illustrates an example implementation of a transmit electromagnetic vector sensor and an example implementation of a receive electromagnetic vector sensor offset from each other with similar orientations;

FIG. 5-5 illustrates an example implementation of a transmit electromagnetic vector sensor and an example implementation of a receive electromagnetic vector sensor offset from each other with opposite orientations;

FIG. 7-1 illustrates an example implementation of a transceiver;

FIG. 7-2 illustrates another example implementation of a transceiver;

DETAILED DESCRIPTION

Overview

Integrating a radar system within an electronic device can be challenging. The electronic device, for example, may have a limited amount of available space. To meet a size or layout constraint of the electronic device, the radar system can be implemented with fewer antennas. This can make it challenging, however, for the radar system to realize a target angular resolution.

To address this challenge, techniques are described that implement electromagnetic vector sensors (EMUS) for a smart-device-based radar system. Instead of including an antenna array of similar antenna elements, the radar system includes two or more electromagnetic vector sensors. At least one of the electromagnetic vector sensors is used for transmission and at least another of the electromagnetic vector sensors is used for reception. Each electromagnetic vector sensor includes a group of antennas with different antenna patterns, orientations, and/or polarizations. The various antenna patterns and polarizations of these antennas enable the radar system to perform angle estimation, object or material classification, and/or multipath interference rejection. An overall footprint of the two electromagnetic vector sensors (e.g., one for transmission and one for reception) can be smaller than antenna arrays used by other radar systems, thereby enabling the radar system to be implemented within space-constrained devices.

Operating Environment

Figure 1:
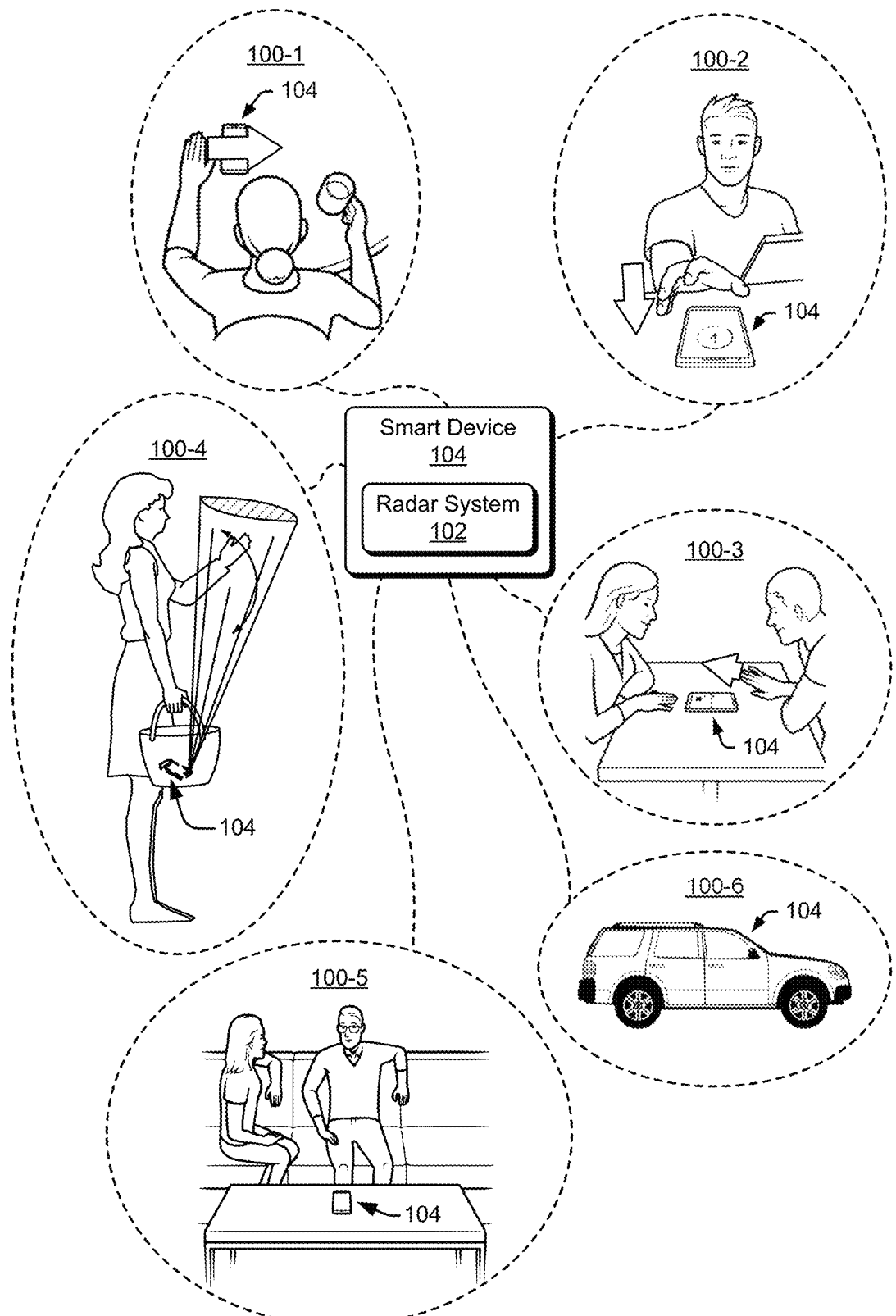
FIG. 1 illustrates example environments in which electromagnetic vector sensors for a smart-device-based radar system can be implemented.

FIG. 1 is an illustration of example environments 100-1 to 100-6 in which techniques using, and an apparatus including, a smart-device-based radar system with electromagnetic vector sensors may be embodied. In the depicted environments 100-1 to 100-6, a smart device 104 includes a radar system 102 capable of detecting one or more objects (e.g., users) using electromagnetic vector sensors (of FIG. 2). The smart device 104 is shown to be a smartphone in environments 100-1 to 100-5 and a smart vehicle in the environment 100-6.

In the environments 100-1 to 100-4, a user performs different types of gestures, which are detected by the radar system 102. In some cases, the user performs a gesture using an appendage or body part. Alternatively, the user can also perform a gesture using a stylus, a hand-held object, a ring, or any type of material that can reflect radar signals. The radar system 102 uses electromagnetic vector sensors to recognize the gesture that is performed. The radar system 102 can also use electromagnetic vector sensors to distinguish between multiple users, which may or may not be at a same distance (e.g., slant range) from the radar system 102.

In environment 100-1, the user makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The users in environment 100-3 make hand gestures to play a game on the smart device 104. In one instance, a user makes a pushing gesture by moving a hand above the smart device 104 along a vertical dimension (e.g., from a bottom side of the smart device 104 to a top side of the smart device 104). Using electromagnetic vector sensors, the radar system 102 can recognize the gestures performed by the user. In the environment 100-4, the smart device 104 is stored within a purse, and the radar system 102 provides occluded-gesture recognition by detecting gestures that are occlude by the purse.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, move a cursor, activate one or more sensors, open an application, and so forth. In this way, the radar system 102 provides touch-free control of the smart device 104.

In the environment using 100-5, the radar system 102 generates a three-dimensional map of a surrounding environment for contextual awareness. The radar system 102 also detects and tracks multiple users to enable both users to interact with the smart device 104. The radar system 102 can also perform vital-sign detection. In the environment 100-6, the radar system 102 monitors vital signs of a user that drives a vehicle. Example vital signs include a heart rate and a respiration rate. If the radar system 102 determines that the driver is falling asleep, for instance, the radar system 102 can cause the smart device 104 to alert the user. Alternatively, if the radar system 102 detects a life threatening emergency, such as a heart attack, the radar system 102 can cause the smart device 104 to alert a medical professional or emergency services. In some implementations, the radar system 102 in the environment 100-6 can support collision avoidance for autonomous driving.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with the electromagnetic vector sensors included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth). The smart device 104 and the radar system 102 are further described with respect to FIG. 2.

Figure 2:
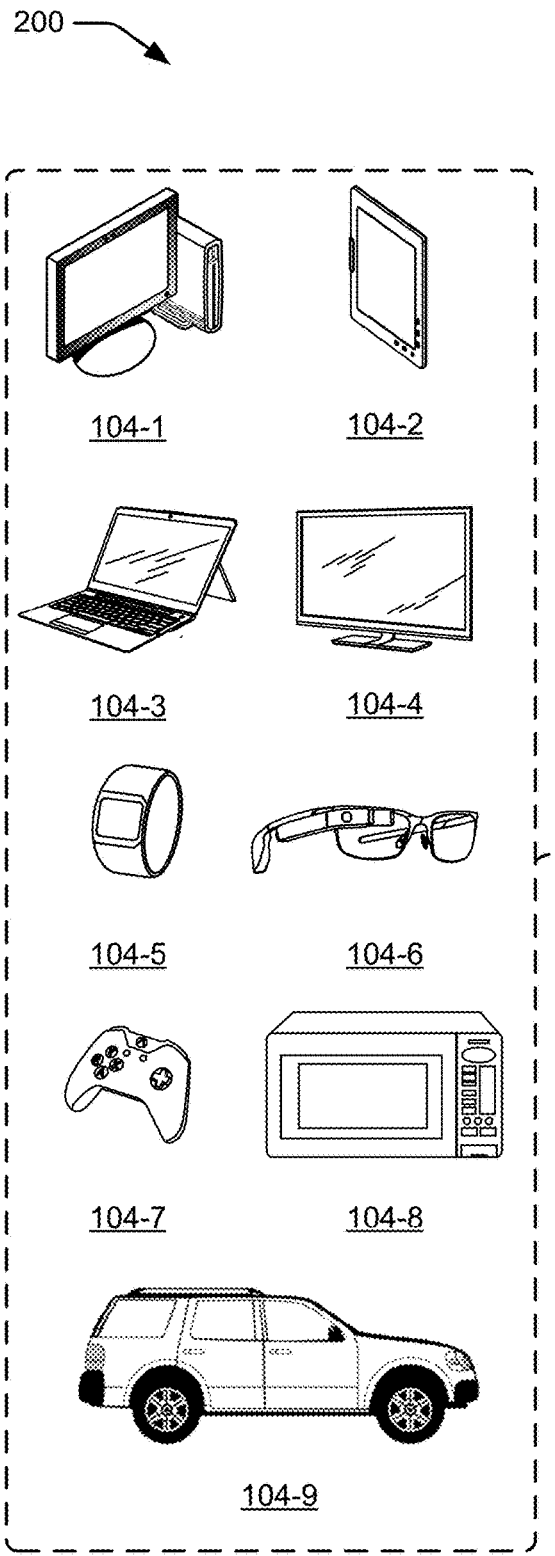
FIG. 2 illustrates an example implementation of a radar system as part of a smart device.
Figure 2:
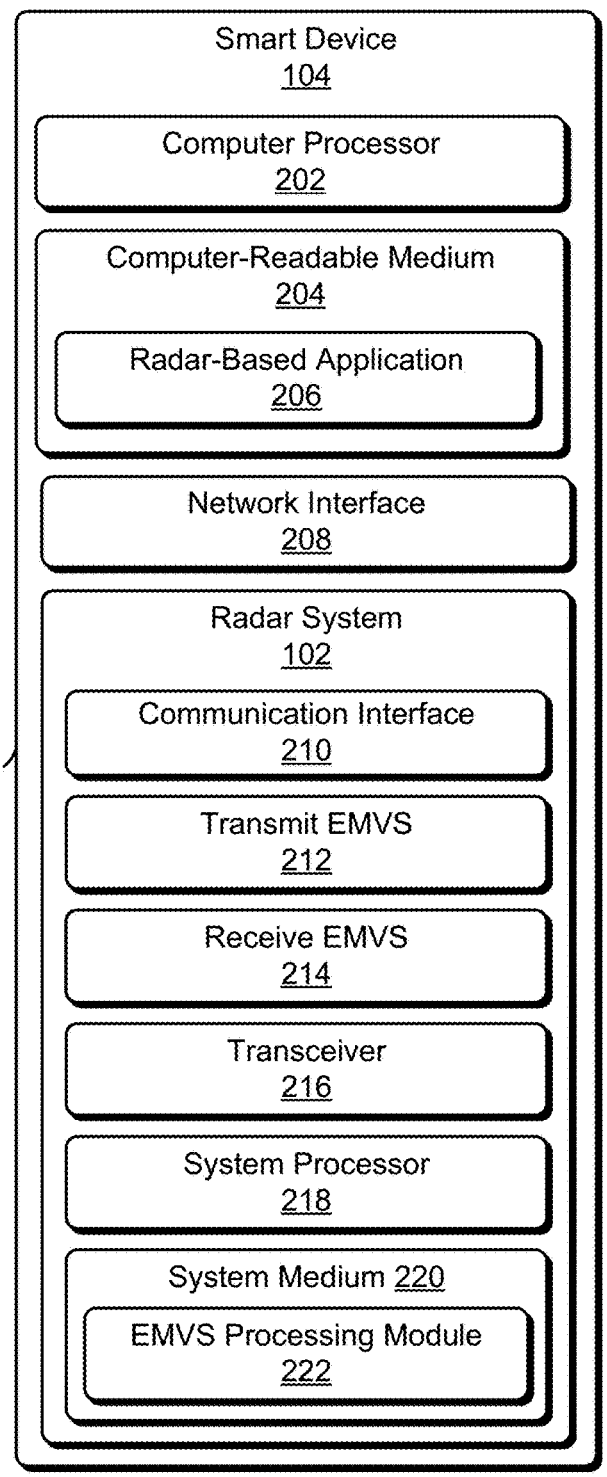

FIG. 2 illustrates the radar system 102 as part of the smart device 104. The smart device 104 is illustrated with various non-limiting example devices including a desktop computer 104-1, a tablet 104-2, a laptop 104 3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and at least one computer-readable medium 204, which includes memory medium and storage medium. Applications and/or an operating system (not shown) embodied as computer-readable instructions on the computer-readable medium 204 can be executed by the computer processor 202 to provide some of the functionalities described herein. The computer-readable medium 204 also includes a radar-based application 206, which uses radar data generated by the radar system 102 to perform a function, such as presence detection, gesture-based touch-free control, collision avoidance for autonomous driving, human vital-sign notification, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include a display (not shown).

The radar system 102 includes a communication interface 210 to transmit the radar data to a remote device, though this need not be used when the radar system 102 is integrated within the smart device 104. In general, the radar data provided by the communication interface 210 is in a format usable by the radar-based application 206.

The radar system 102 also includes at least one transmit electromagnetic vector sensor 212, at least one receive electromagnetic vector sensor 214, and at least one transceiver 216 to transmit and receive radar signals. The transmit electromagnetic vector sensor 212 includes at least two antennas associated with different polarizations. The receive electromagnetic vector sensor 214 includes at least three antennas associated with different polarizations. The antennas of the transmit electromagnetic vector sensor 212 and the receive electromagnetic vector sensor 214 can be horizontally polarized, vertically polarized, or circularly polarized. In some situations, the transmit electromagnetic vector sensor 212 and the receive electromagnetic vector sensor 214 implement a multiple-input multiple-output (MIMO) radar capable of transmitting and receiving multiple distinct waveforms at a given time.

The transceiver 216 includes circuitry and logic for transmitting radar signals via the transmit electromagnetic vector sensor 212 and receiving reflected versions of the radar signals via the receive electromagnetic vector sensor 214. Components of the transceiver 216 can include amplifiers, phase shifters, mixers, switches, analog-to-digital converters, or filters for conditioning the radar signals. The transceiver 216 also includes logic to perform in phase/quadrature (I/Q) operations, such as modulation or demodulation. A variety of modulations can be used, including linear frequency modulations, triangular frequency modulations, stepped frequency modulations, or phase modulations. Alternatively, the transceiver 216 can produce radar signals having a relatively constant frequency or a single tone. The transceiver 216 can be configured to support continuous-wave or pulsed radar operations.

A frequency spectrum (e.g., range of frequencies) that the transceiver 216 uses to generate the radar signals can encompass frequencies between 1 and 400 gigahertz (GHz), between 4 and 100 GHz, between 1 and 24 GHz, between 2 and 4 GHz, between 50 and 70 GHz, between 57 and 64 GHz, or at approximately 2.4 GHz. In some cases, the frequency spectrum can be divided into multiple sub-spectrums that have similar or different bandwidths. The bandwidths can be on the order of 500 megahertz (MHz), 1 GHz, 2 GHz, and so forth. In some cases, the bandwidths are approximately 20% or more of a center frequency to implement an ultrawideband radar.

Different frequency sub-spectrums may include, for example, frequencies between approximately 57 and 59 GHz, 59 and 61 GHz, or 61 and 63 GHz. Although the example frequency sub-spectrums described above are contiguous, other frequency sub-spectrums may not be contiguous. Multiple frequency sub-spectrums (contiguous or not) that have a same bandwidth may be used by the transceiver 216 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 218 and at least one system medium 220 (e.g., one or more computer-readable storage media). The system medium 220 includes an electromagnetic-vector-sensor (EMVS) processing module 222. The electromagnetic-vector-sensor processing module 222 enables the system processor 218 to process responses from the receive electromagnetic vector sensor 214 to detect a user, determine a position of the user, recognize a gesture performed by the user, measure a vital sign of the user, or perform collision avoidance.

For example, the electromagnetic-vector-sensor processing module 222 can analyze samples of the received radar signals from the receive electromagnetic vector sensor 214 to estimate an angle to an object (or an angle to a portion of the user). In particular, the electromagnetic-vector-sensor processing module 222 can apply the least-squares principle and compute a cost function for a range of angles (e.g., azimuth and/or elevation) to generate information representative of a 2D image. A peak response within the 2D image can be used to estimate an angle to the object.

Also, the electromagnetic-vector-sensor processing module 222 can determine a material composition of the object and/or classify the object. For example, the electromagnetic-vector-sensor processing module 222 can classify the object as a human or an inanimate object. In an example instance, the electromagnetic-vector-sensor processing module 222 can determine a polarimetric signature of the object (or an object reflection matrix) to determine reflection characteristics of the object. Based on these reflection characteristics, the electromagnetic-vector-sensor processing module 222 can classify the object.

Additionally or alternatively, the electromagnetic-vector-sensor processing module 222 can detect and attenuate multipath interference or clutter within the received radar signals. By attenuating the interference, the radar system 102 can achieve a higher accuracy in estimating a position of the object and achieve a lower false-alarm rate.

In an alternative implementation (not shown), the electromagnetic-vector-sensor processing module 222 is included within the computer-readable medium 204 and implemented by the computer processor 202. This enables the radar system 102 to provide the smart device 104 raw data via the communication interface 210 such that the computer processor 202 can process the raw data for the radar-based application 206. General operations of the radar system 102 are further described with respect to FIG. 3.

Figure 3:
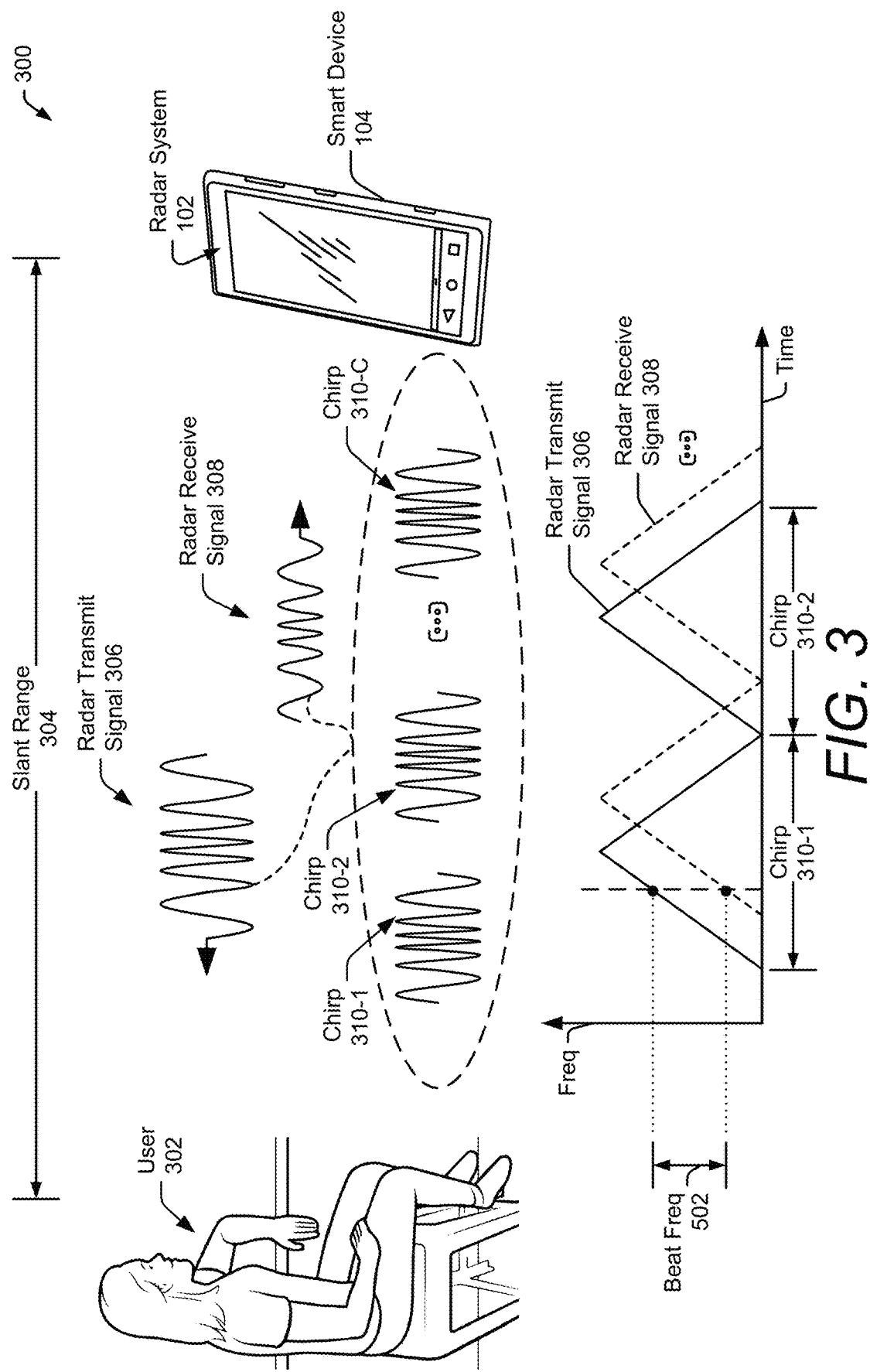
FIG. 3 illustrates operation of an example radar system.

FIG. 3 illustrates an example operation of the radar system 102. In the depicted configuration, the radar system 102 is implemented as a frequency-modulated continuous-wave radar. However, other types of radar architectures can be implemented, as described above with respect to FIG. 2. In environment 300, a user 302 is located at a particular slant range 304 from the radar system 102. To detect the user 302, the radar system 102 transmits a radar transmit signal 306. At least a portion of the radar transmit signal 306 is reflected by the user 302. This reflected portion represents a radar receive signal 308. The radar system 102 receives the radar receive signal 308 and processes the radar receive signal 308 to extract data for the radar-based application 206. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-C, where C represents a positive integer greater than one. The radar system 102 can transmit the chirps 310-1 to 310-C in a continuous burst or transmit the chirps 310-1 to 310-C as time-separated pulses. A duration of each chirp 310-1 to 310-C can be on the order of tens or thousands of microseconds (e.g., between approximately 30 microseconds (µs) and 5 milliseconds (ms)), for instance.

Individual frequencies of the chirps 310-1 to 310-C can increase or decrease over time. In the depicted example, the radar system 102 employs a two-slope cycle (e.g., triangular frequency modulation) to linearly increase and linearly decrease the frequencies of the chirps 310-1 to 310-C over time. The two-slope cycle enables the radar system 102 to measure the Doppler frequency shift caused by motion of the user 302. In general, transmission characteristics of the chirps 310-1 to 310-C (e.g., bandwidth, center frequency, duration, and transmit power) can be tailored to achieve a particular detection range, range resolution, or Doppler sensitivity for detecting one or more characteristics the user 302 or one or more actions performed by the user 302.

At the radar system 102, the radar receive signal 308 represents a delayed version of the radar transmit signal 306. The amount of delay is proportional to the slant range 304 (e.g., distance) from the radar system 102 to the user 302. In particular, this delay represents a summation of a time it takes for the radar transmit signal 306 to propagate from the radar system 102 to the user 302 and a time it takes for the radar receive signal 308 to propagate from the user 302 to the radar system 102. If the user 302 is moving, the radar receive signal 308 is shifted in frequency relative to the radar transmit signal 306 due to the Doppler effect. Similar to the radar transmit signal 306, the radar receive signal 308 is composed of one or more of the chirps 310-1 to 310-C. The multiple chirps 310-1 to 310-C enable the radar system 102 to make multiple observations of the user 302 over a predetermined time period.

The radar system 102 uses the transmit electromagnetic vector sensor 212 to transmit the radar transmit signal 306. The radar system 102 also uses the receive electromagnetic vector sensor 214 to receive the radar receive signal 308. Example implementations of the transmit electromagnetic vector sensor 212 and the receive electromagnetic vector sensor 214 are further described with respect to FIGS. 4-1 to 6.

Figures 1, 4:
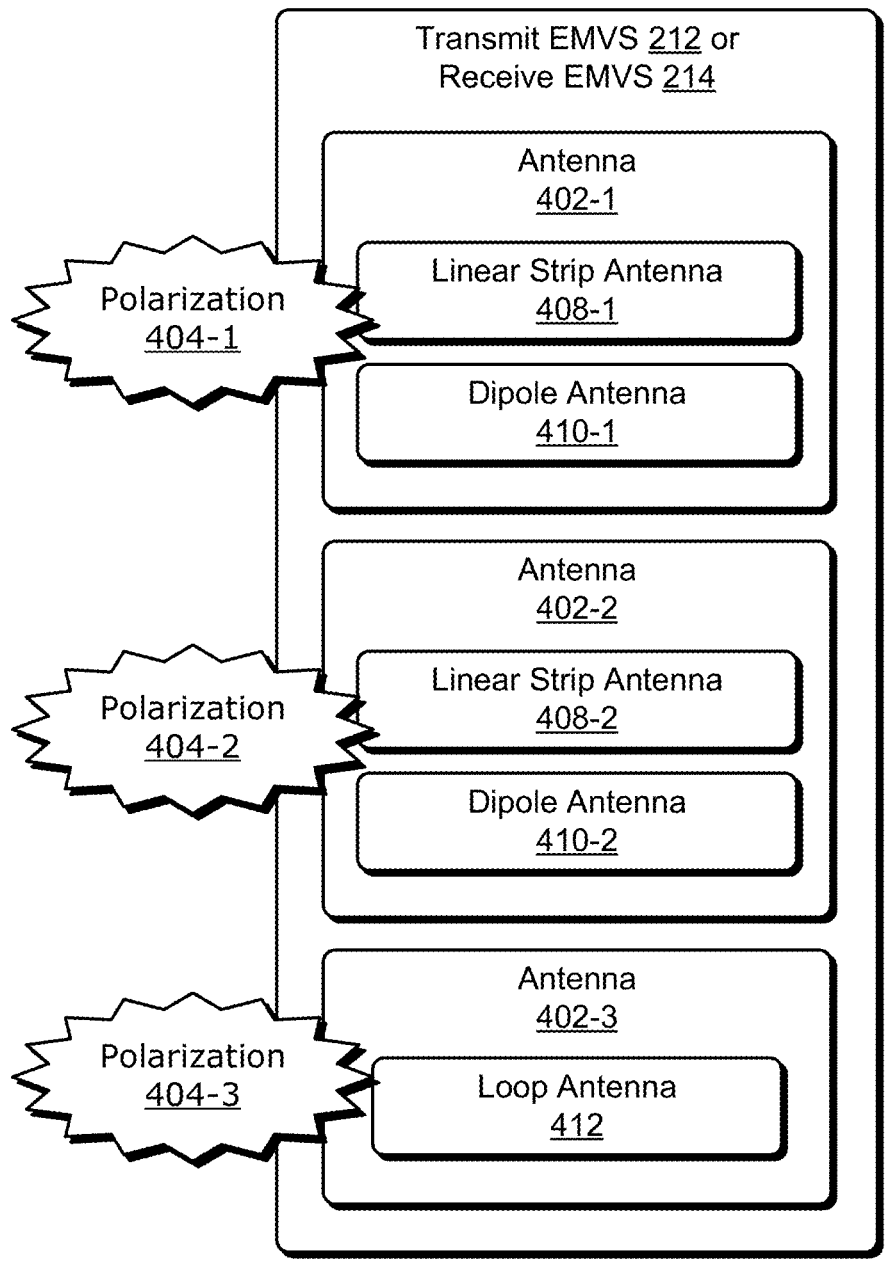
Figures 2, 4:
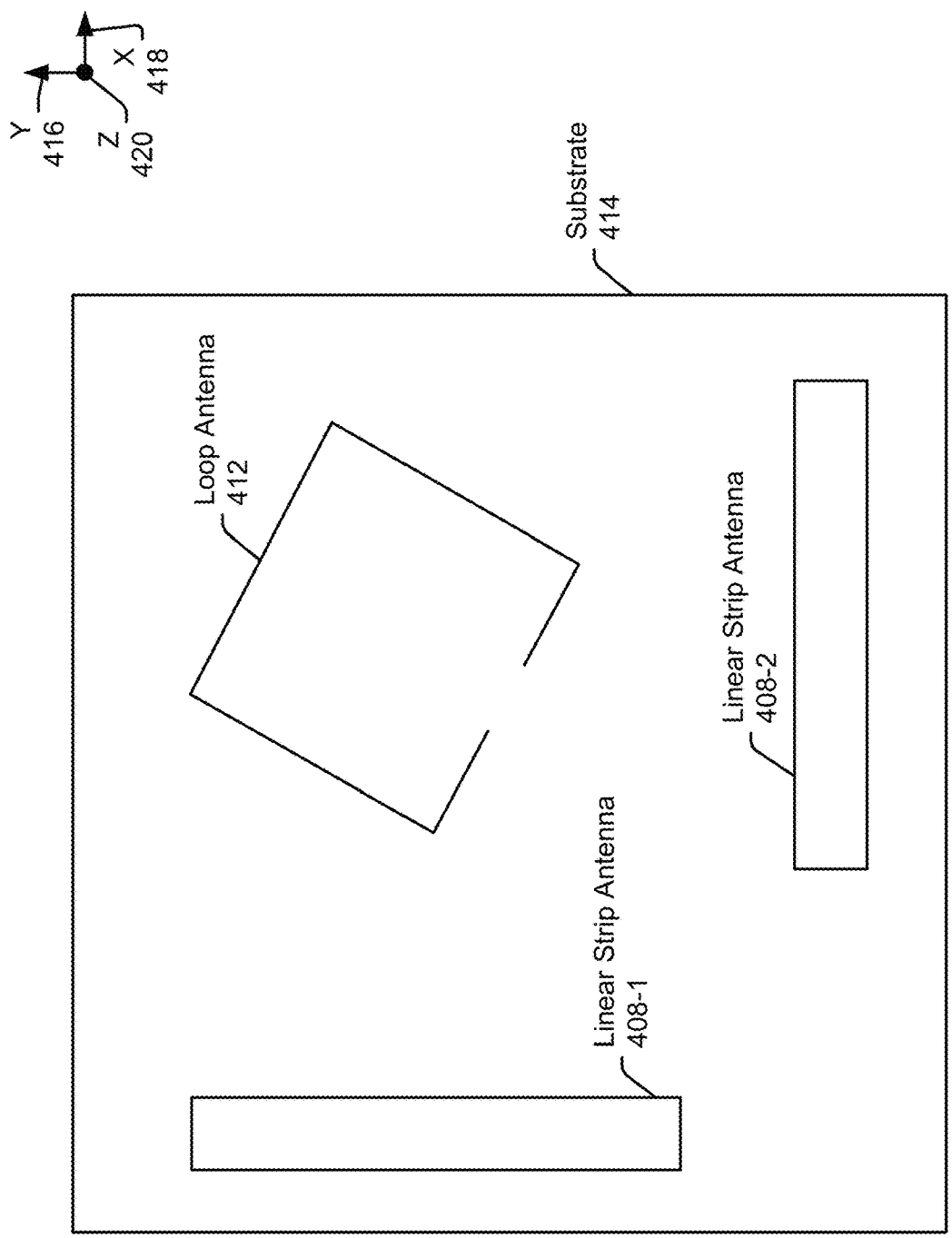

FIG. 4-1 illustrates example components of the transmit electromagnetic vector sensor 212 or the receive electromagnetic vector sensor 214. Each electromagnetic vector sensor 212 and 214 includes multiple antennas 402. In example implementations, the transmit electromagnetic vector sensor 212 includes at least two antennas 402 (e.g., antennas 402-1 and 402-2). The transmit electromagnetic vector sensor 212 can optionally include the antenna 402-3. The receive electromagnetic vector sensor 214 includes at least three antennas 402 (e.g., antennas 402-1, 402-2, and 402-3).

The antennas 402-1 to 402-3 have respective polarizations 404-1 to 404-3. The polarizations 404-1 to 404-3 can be unique polarizations that differ based on differences in the orientations, designs and/or operations of the antennas 402-1 to 402-3. In an example implementation, the polarizations 404-1 to 404-3 are orthogonal (e.g., normal) to each other. For example, the polarization 404-1 can be a first linear polarization along a first axis (e.g., a vertical or Y axis), the polarization 404-2 can be a second linear polarization along a second axis (e.g., a horizontal or X axis) that is orthogonal to the first axis, and the polarization 404-3 can be a third linear polarization along a third axis (e.g., a Z axis) that is orthogonal to the first axis and the second axis.

In other implementations, one or more of the polarizations 404-1 to 404-3 can be a circular polarization, such as a right-hand circular polarization (RHCP) or a left-hand circular polarization (LHCP). For example, the polarizations 404-1 and 404-2 can be orthogonal linear polarizations and the polarization 404-3 can be a circular polarization. Other polarizations are also possible, including elliptical polarizations.

For implementations in which the polarization 404-1 represents a linear polarization, the antenna 402-1 can be implemented using a linear strip antenna 408-1 (e.g., a rectangular microstrip antenna or a rectangular patch antenna). The antenna 402-1 can also be implemented as a dipole antenna 410-1. Likewise, the antenna 402-2 can be implemented as a linear strip antenna 408-2 or a dipole antenna 410-2 to provide another linear polarization as the polarization 404-2. In some implementations, the dipole antennas 410-1 and 410-2 can be implemented as a type of linear strip antenna 408.

To enable the antennas 402-1 and 402-2 to have different polarizations, the antennas 402-1 and 402-2 can be oriented differently from each other. For example, the antenna 402-1 can have a length that is oriented along a vertical axis, and the antenna 402-2 can have a length that is oriented along a horizontal axis. In some implementations, the antennas 402-1 and 402-2 are oriented perpendicular to each other.

For implementations in which the polarization 404-3 represents an additional linear polarization, the antenna 402-3 can be implemented using a loop antenna 412 (e.g., a ring-patch antenna). In some implementations, the loop antenna 412 is formed using a C-shaped conductor. In alternative implementations, the loop antenna 412 can have a rectangular shape, a circular shape, an elliptical shape, or a triangular shape. In general, a variety of different types of antennas can be used to implement one or more antennas of the transmit electromagnetic vector sensor 212 or the receive electromagnetic vector sensor 214, including linear strip antennas, dipole antennas, loop antennas, patch antennas, or crossed-dipole antennas.

The quantity of antennas within each of the transmit electromagnetic vector sensor 212 and the receive electromagnetic vector sensor 214 can be limited to three or less in order to enable the radar system to fit within space-constrained devices, such as the smart device 104. However, other implementations of the radar system can include a transmit electromagnetic vector sensor 212 and/or a receive electromagnetic vector sensor with more than three antennas. As an example, the transmit electromagnetic vector sensor 214 or the receive electromagnetic vector sensor 214 can include a fourth antenna with a different antenna pattern, polarization, and/or orientation relative to the antennas 402-1 to 402-3. An example arrangement of the antennas 402-1 to 402-3 of the transmit electromagnetic vector sensor or the receive electromagnetic vector sensor is further described with respect to FIG. 4-2.

FIG. 4-2 illustrates an example implementation of the transmit electromagnetic vector sensor 212 or the receive electromagnetic vector sensor 214. In the depicted configuration, the transmit electromagnetic vector sensor 212 or the receive electromagnetic vector sensor 214 includes the linear strip antenna 408-1, the linear strip antenna 408-2, and the loop antenna 412, which are disposed on a substrate 414. In this manner, the linear strip antenna 408-1, the linear strip antenna 408-2, and the loop antenna 412 are coplanar (e.g., are disposed on a common plane).

The linear strip antenna 408-1 has a length that is oriented along a vertical (Y) axis 416 (Y 416). In this way, the polarization 404-1 of the linear strip antenna 408-1 is along the Y axis 416. The linear strip antenna 408-2 has a length that is oriented along a horizontal (X) axis 418 (X 418). As such, the polarization 404-2 of the linear strip antenna 408-2 is oriented along the X axis 418. The linear-strip antennas 408-1 and 408-2 are offset from each other along the vertical axis 416, the horizontal axis 418, or a combination thereof.

In the depicted configuration, the loop antenna 412 has a C-shaped pattern. In some implementations, a dimension of the loop antenna 412 along the vertical axis 416 can be less than or equal to the length of the linear strip antenna 408-1. Also, another dimension of the loop antenna 412 along the horizontal axis 418 can be less than or equal to the length of the linear strip antenna 408-2. The polarization 404-3 of the loop antenna 412 is along a Z axis 420, which is orthogonal to the Y axis 416 and the X axis 418.

If the loop antenna 412 has relatively straight sides, these sides can be oriented at approximately a +/−45 degree angle. This orientation can reduce coupling between portions of the loop antenna 412 and the linear strip antennas 408-1 and 408-2. The loop antenna 412 can also be positioned in a manner that reduces an overall footprint of the transmit electromagnetic vector sensor 212 or the receive electromagnetic vector sensor 214. For example, the loop antenna 412 and the linear strip antenna 408-2 can be positioned on a same side of the linear strip antenna 408-1 (e.g., on a right side of the linear strip antenna 408-1). Also, the loop antenna 412 and the linear strip antenna 408-1 can be positioned on a same side of the linear strip antenna 408-2 (e.g., on a left side of the linear strip antenna 408-2).

The positioning of the loop antenna 412 can also be further explained based on axes that intersect the linear strip antennas 408-1 and 408-2. Consider a first axis that intersects a center of the linear strip antenna 408-1 and is parallel to the horizontal axis 418. Also consider a second axis that intersects a center of the linear strip antenna 408-2 and is parallel to the vertical axis 416. In FIG. 4-2, an intersection of the first axis and the second axis indicates a general position of the loop antenna 412. The transmit electromagnetic vector sensor 212 and the receive electromagnetic vector sensor 214 can be implemented together on a common plane or on a same substrate 414, as further described with respect to FIGS. 5-1 to 6.

Figures 1, 5:
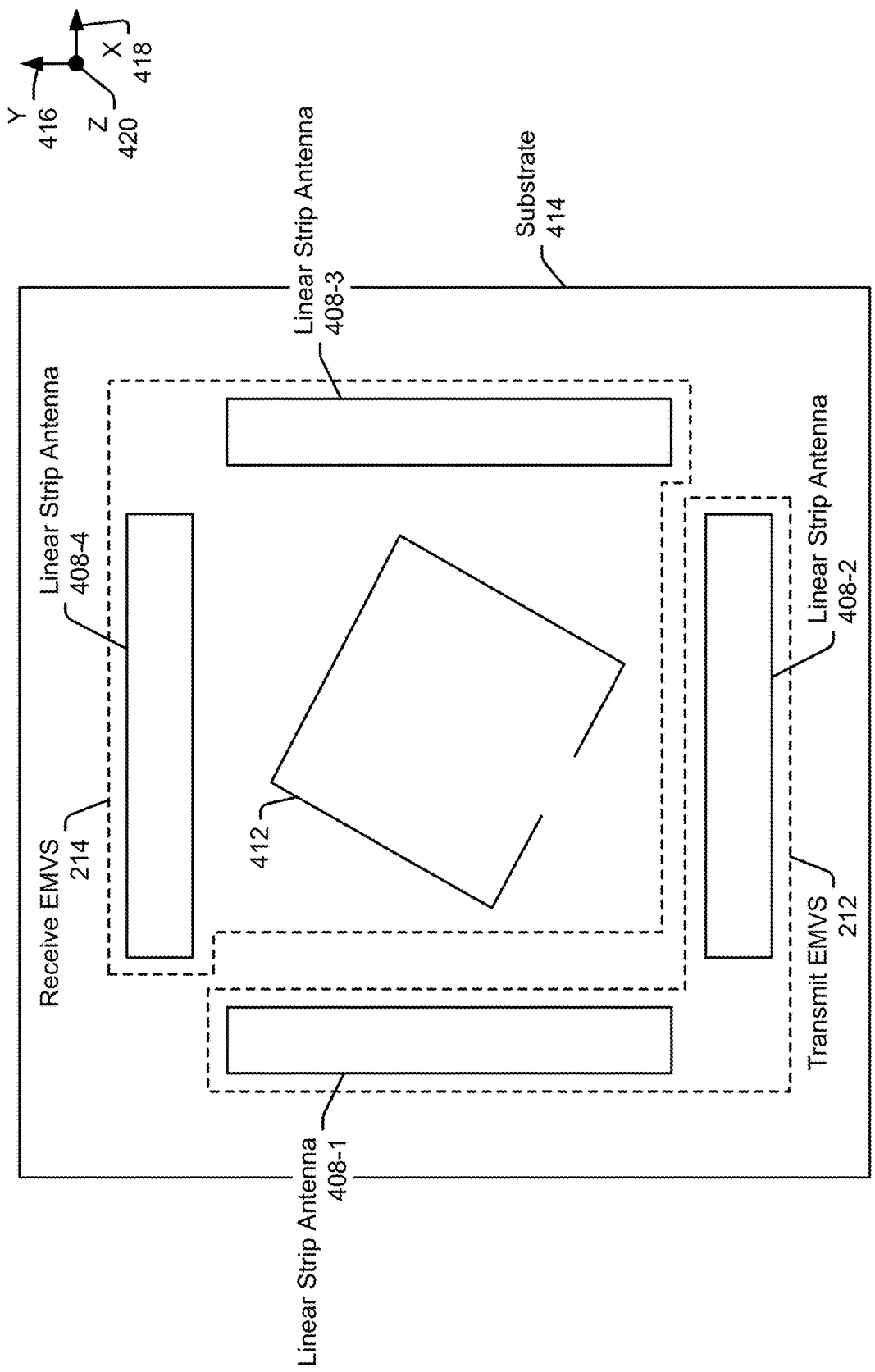
Figures 2, 5:
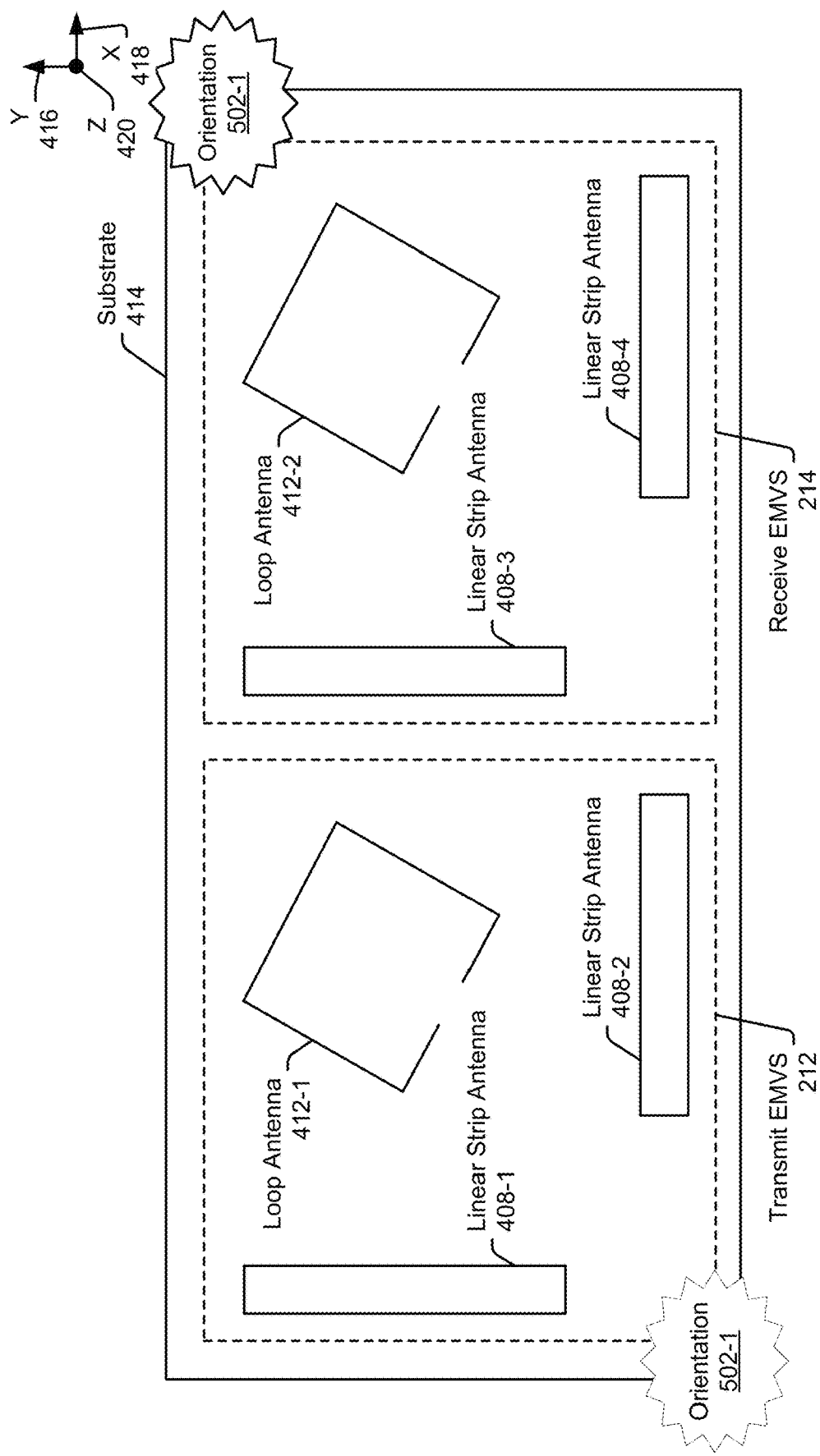
Figures 3, 5:
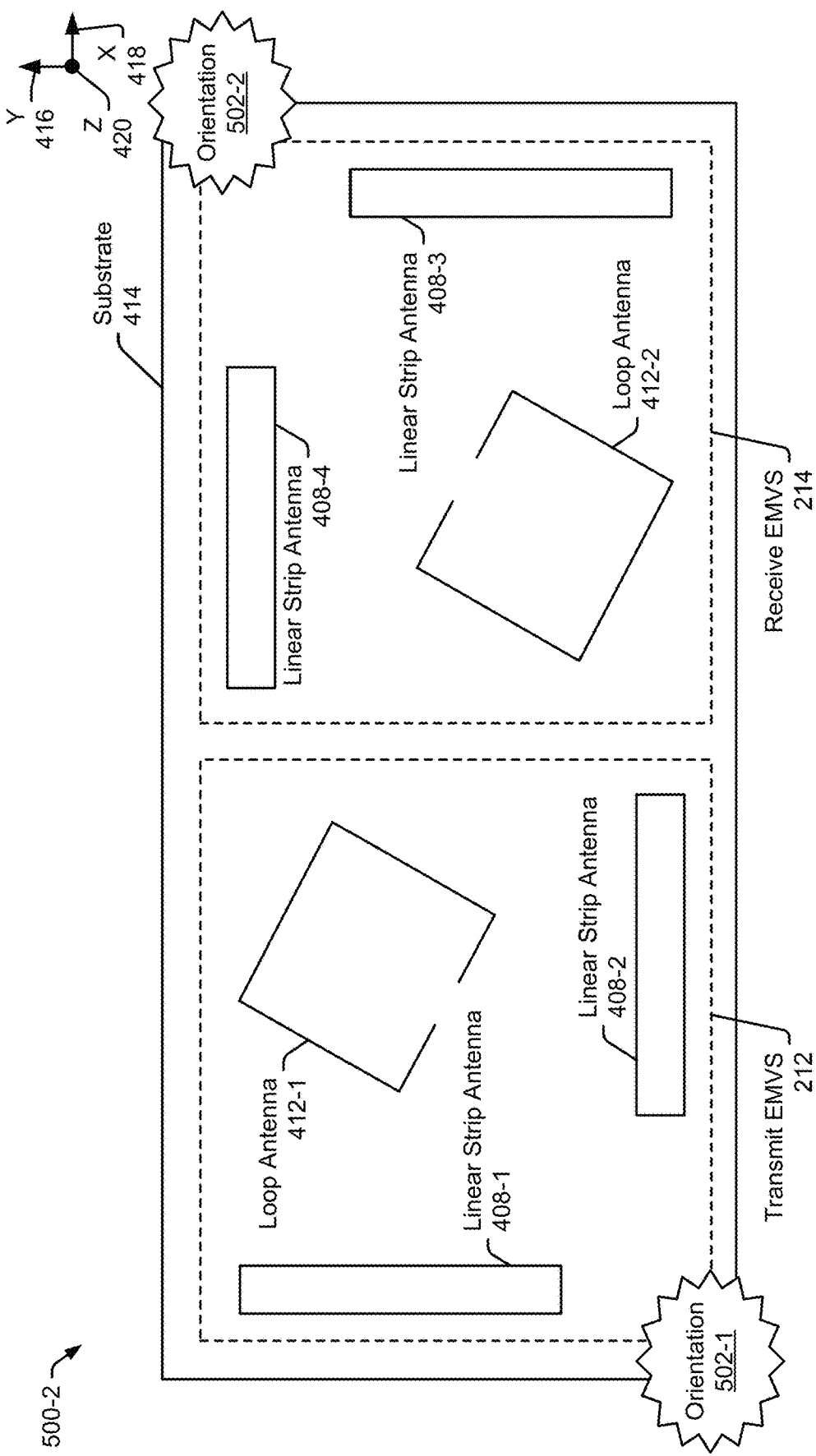
Figures 4, 5:
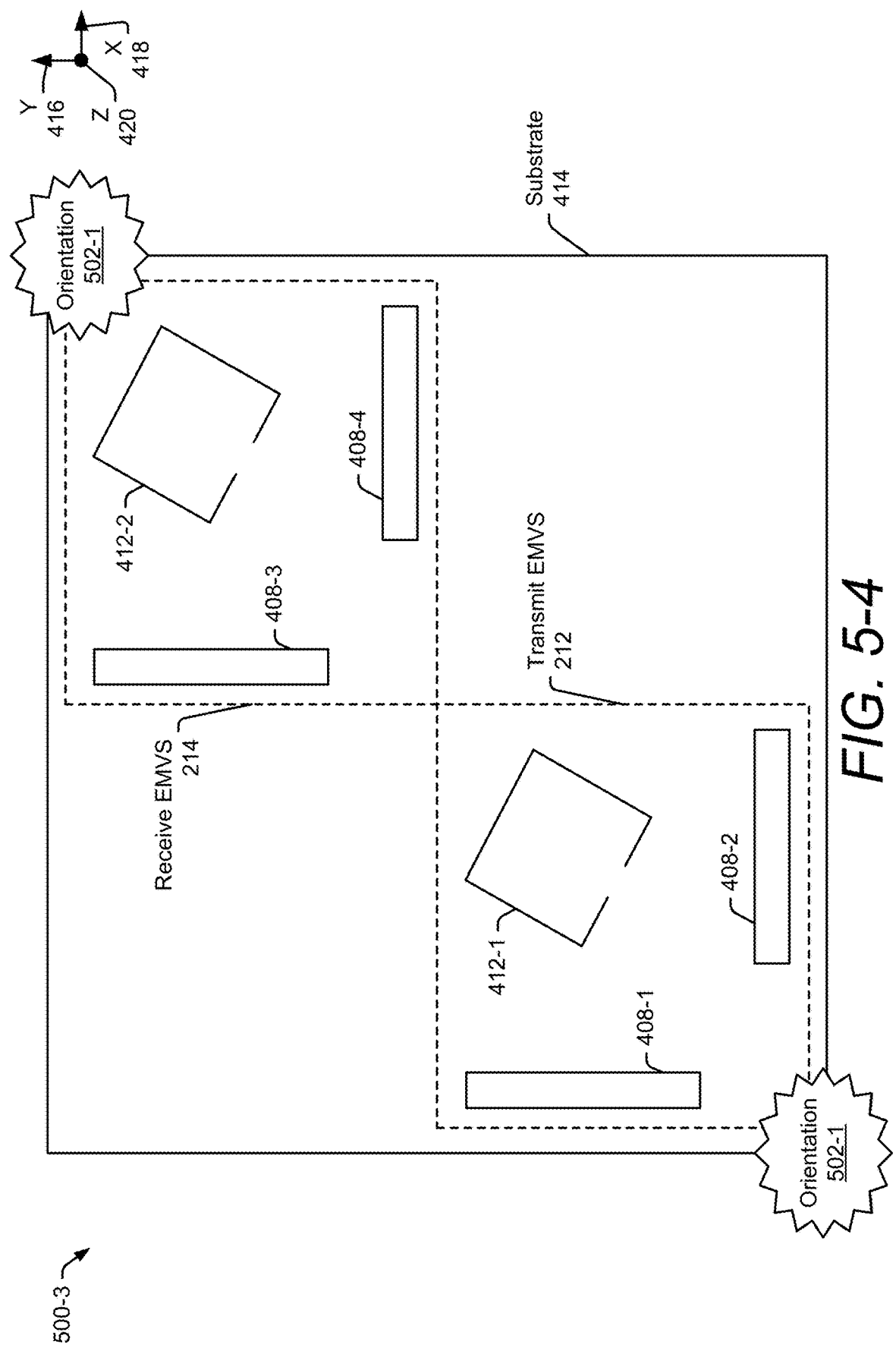

FIG. 5-1 illustrates an example implementation of the transmit electromagnetic vector sensor 212 and an example implementation of the receive electromagnetic vector sensor 214. In the depicted configuration, the transmit electromagnetic vector sensor 212 includes the linear strip antenna 408-1 and the linear strip antenna 408-2. The receive electromagnetic vector sensor 214 includes the linear strip antenna 408-3, the linear strip antenna 408-4, and the loop antenna 412.

In the depicted configuration, the loop antenna 412 is positioned between the linear strip antennas 408-1 and 408-3 along the horizontal axis 418. Also, the loop antenna 412 is positioned between the linear strip antennas 408-2 and 408-4 along the vertical axis 416. In this example implementation, the transmit electromagnetic vector sensor 212 and the receive electromagnetic vector sensor 214 can have a combined footprint of approximately three millimeters by three millimeters. In other words, a distance between the linear strip antennas 408-1 and 408-3 is approximately three millimeters, and a distance between the linear strip antennas 408-2 and 408-4 is approximately three millimeters.

The compact design of the transmit electromagnetic vector sensor 212 and the receive electromagnetic vector sensor 214 of FIG. 5-1 can allow the radar system 102 to fit within space-constrained devices, such as the smart device 104. For devices that have available space, the transmit electromagnetic vector sensor 212 can be implemented with an additional antenna and/or a distance between the transmit electromagnetic vector sensor 212 and the receive electromagnetic vector sensor 214 can be increased to reduce cross-coupling, as further described with respect to FIGS. 5-2 to 6.

FIG. 5-2 illustrates an example implementation of the transmit electromagnetic vector sensor 212 and an example implementation of the receive electromagnetic vector sensor 214 positioned side-by-side with similar orientations 502-1. In the depicted configuration, the antennas 402 of the transmit electromagnetic vector sensor 212 are disposed on a first portion of the substrate 414 (e.g., a left portion of the substrate 414). The antennas 402 of the receive electromagnetic vector sensor 214 are disposed on a second portion of the substrate 414 (e.g., a right portion of the substrate 414). The antennas 402 of the transmit electromagnetic vector sensor 212 are coplanar with the antennas 402 of the receive electromagnetic vector sensor 214.

In this example, the transmit electromagnetic vector sensor 212 and the receive electromagnetic vector sensor 214 are similar to the implementation shown in FIG. 4-2. In particular, the transmit electromagnetic vector sensor 212 includes the linear strip antennas 408-1 and 408-2. The transmit electromagnetic vector sensor 212 also includes the loop antenna 412-1. The receive electromagnetic vector sensor 214 includes the linear strip antennas 408-3 and 408-4. The receive electromagnetic vector sensor 214 also includes the loop antenna 412-2. The linear strip antennas 408-1 and 408-3 are approximately parallel to each other and are parallel to the vertical axis 416. Also, the linear strip antennas 408-2 and 408-4 are approximately parallel to each other and are parallel to the horizontal axis 418.

The transmit electromagnetic vector sensor 212 and the receive electromagnetic vector sensor 214 have a same orientation 502-1. Based on the orientation 502-1, the linear strip antenna 408-1 is positioned on a left side of the loop antenna 412-1 along the horizontal axis 418. Also the linear strip antenna 408-2 is positioned on a bottom side of the loop antenna 412-1 along the vertical axis 416. Likewise, the linear strip antenna 408-3 is positioned on a left side of the loop antenna 412-2 and the linear strip antenna 408-4 is positioned on a bottom side of the loop antenna 412-2. As such, the loop antenna 412-1 is generally positioned between the linear strip antennas 408-1 and 408-3 along the horizontal axis 418. Also, the linear strip antenna 408-3 is generally positioned between the loop antennas 412-1 and 412-2 along the horizontal axis 418. Lengths of the linear strip antennas 408-2 and 408-4 can be orientated along a same horizontal axis 418.

In the example implementation of FIG. 5-2, the transmit electromagnetic vector sensor 212 and the receive electromagnetic vector sensor 214 can have a combined footprint of approximately three millimeters by five millimeters. In other words, a distance between a furthest edge of the linear strip antenna 408-2 or 408-4 and a furthest edge of the linear strip antenna 408-1 or 408-3 along the vertical axis 416 is approximately three millimeters. Also, a distance between a furthest edge of the linear strip antenna 408-1 and a furthest edge of the linear strip antenna 408-4 along the horizontal axis 418 is approximately five millimeters.

In this example, both the transmit electromagnetic vector sensor 212 and the receive electromagnetic sensor 214 are arranged in a same orientation 502-1. While it may be easier to manufacture the transmit electromagnetic vector sensor 212 and the receive electromagnetic sensor 214 with the same orientation 502-1, the cross-coupling between the linear strip antennas 408-1 and 408-3 and the cross-coupling between the linear strip antennas 408-2 and 408-4 can be reduced by implementing the transmit electromagnetic vector sensor 212 and the receive electromagnetic vector sensor 214 with different orientations, as further described with respect to FIG. 5-3.

FIG. 5-3 illustrates an example implementation of the transmit electromagnetic vector sensor 212 and an example implementation of the receive electromagnetic vector sensor 214 positioned side-by-side in different orientations 502-1 and 502-2, respectively. In this example, the receive electromagnetic vector sensor 214 has the orientation 502-2, which differs from the orientation 502-1 of the transmit electromagnetic vector sensor 212. In one aspect, the orientation 502-2 is rotated approximately 180 degrees relative to the orientation 502-1.

Based on the orientation 502-2, the linear strip antenna 408-3 is positioned on a right side of the loop antenna 412-2 along the horizontal axis 418. Also the linear strip antenna 408-4 is positioned on a top side of the loop antenna 412-2 along the vertical axis 416. As such, the loop antennas 412-1 and 412-2 are generally positioned between the linear strip antennas 408-1 and 408-3 along the horizontal axis 418. Also, the loop antennas 412-1 and 412-2 are generally positioned between the linear strip antennas 408-2 and 408-4 along the vertical axis 416.

In general, the linear strip antennas 408-1 and 408-3 are positioned on opposite sides of the substrate 414 (e.g., a left side and a right side). Consider a vertical axis 416 that intersects a center of the linear strip antenna 408-2 or 408-4. In this case, the linear strip antennas 408-2 and 408-4 are positioned on opposite sides of the vertical axis 416. The linear strip antennas 408-2 and 408-4 are also positioned on opposite sides of the substrate 414 (e.g., a top side and a bottom side). Consider a horizontal axis 418 that intersects a center of the linear strip antenna 408-1 or 408-3. In this case, the linear strip antennas 408-2 and 408-4 are positioned on opposite sides of the horizontal axis 418.

By having the transmit electromagnetic vector sensor 212 in the orientation 502-1 and the receive electromagnetic vector sensor 214 in the orientation 502-2, a distance between the linear strip antennas 408-1 and 408-3 and another distance between the linear strip antennas 408-2 and 408-4 can be larger relative to the distances shown in FIG. 5-2. With larger distances between antennas associated with similar polarizations, the radar system 102 can reduce cross-coupling between the transmit electromagnetic vector sensor 212 and the receive electromagnetic vector sensor 214.

In the example implementation of FIG. 5-3, the transmit electromagnetic vector sensor 212 and the receive electromagnetic vector sensor 214 can have a combined footprint of approximately three millimeters by five millimeters. In other words, a distance between a furthest edge of the linear strip antenna 408-2 and 408-4 along the vertical axis 416 is approximately three millimeters. Also, a distance between a furthest edge of the linear strip antenna 408-1 and a furthest edge of the linear strip antenna 408-3 along the horizontal axis 418 is approximately five millimeters.

In FIGS. 5-2 and 5-3, the transmit electromagnetic vector sensor 212 and the receive electromagnetic vector sensor 214 are positioned next to each other along the horizontal axis 418. In this manner, the antennas 402 of the receive electromagnetic vector sensor 214 are offset from the antennas 402 of the transmit electromagnetic vector sensor 212 along the horizontal axis 418. In other implementations, the antennas 402 of the receive electromagnetic vector sensor 214 can also be offset from the antennas 402 of the transmit electromagnetic vector sensor 212 along the vertical axis 416, as further described with respect to FIGS. 5-4 and 5-5.

FIG. 5-4 illustrates an example implementation of the transmit electromagnetic vector sensor 212 and an example implementation of the receive electromagnetic vector sensor 214 offset from each other with similar orientations 502-1. In the depicted configuration, the antennas 402 of the transmit electromagnetic vector sensor 212 are disposed on a first portion of the substrate 414 (e.g., a bottom-left portion of the substrate 414). The antennas 402 of the receive electromagnetic vector sensor 214 are disposed on a second portion of the substrate 414 (e.g., a top-right portion of the substrate 414). The antennas 402 of the transmit electromagnetic vector sensor 212 are coplanar with the antennas 402 of the receive electromagnetic vector sensor 214. In this example, the antennas 402 of the receive electromagnetic vector sensor 214 are offset along the vertical axis 416 and the horizontal axis 418 relative to the antennas 402 of the transmit electromagnetic vector sensor 212.

In the example implementation of FIG. 5-4, the transmit electromagnetic vector sensor 212 and the receive electromagnetic vector sensor 214 can have a combined footprint of approximately five millimeters by five millimeters. In other words, a distance between a furthest edge of the linear strip antenna 408-2 and a furthest edge of the linear strip antenna 408-3 along the vertical axis 416 is approximately five millimeters. Also, a distance between a furthest edge of the linear strip antenna 408-1 and a furthest edge of the linear strip antenna 408-4 along the horizontal axis 418 is approximately five millimeters.

In this example, both the transmit electromagnetic vector sensor 212 and the receive electromagnetic sensor 214 are arranged in a same orientation 502-1. While it may be easier to manufacture the transmit electromagnetic vector sensor 212 and the receive electromagnetic sensor 214 with the same orientation 502-1, the cross-coupling between the linear strip antennas 408-1 and 408-3 and the cross-coupling between the linear strip antennas 408-2 and 408-4 can be reduced by implementing the transmit electromagnetic vector sensor 212 and the receive electromagnetic vector sensor 214 with different orientations, as further described with respect to FIG. 5-5.

FIG. 5-5 illustrates an example implementation of the transmit electromagnetic vector sensor 212 and an example implementation of the receive electromagnetic vector sensor 214 offset from each other with different orientations 502-1 and 502-2, respectively. In this example, the receive electromagnetic vector sensor 214 has the orientation 502-2, which differs from the orientation 502-1 of the transmit electromagnetic vector sensor 212. As described above with respect to FIG. 5-3, the orientation 502-2 is rotated approximately 180 degrees relative to the orientation 502-1.

In the example implementation of FIG. 5-5, the transmit electromagnetic vector sensor 212 and the receive electromagnetic vector sensor 214 can have a combined footprint of approximately five millimeters by five millimeters. In other words, a distance between a furthest edge of the linear strip antenna 408-2 and a furthest edge of the linear strip antenna 408-4 along the vertical axis 416 is approximately five millimeters. Also, a distance between a furthest edge of the linear strip antenna 408-1 and a furthest edge of the linear strip antenna 408-3 along the horizontal axis 418 is approximately five millimeters.

The example dimensions given for FIGS. 5-1 to 5-5 can be applicable to a radar system 102 that utilizes frequencies between approximately 50 and 70 GHz. In general, a footprint of the transmit electromagnetic vector sensor 212 and the receive electromagnetic vector sensor 214 varies based on the frequencies the radar system 102 is designed to use. Other implementations of the radar system 102, for instance, can utilize larger frequencies (e.g., frequencies greater than 70 GHz) to further decrease the footprint of the transmit electromagnetic vector sensor 212 and the receive electromagnetic vector sensor 214 for other space-constrained devices. Alternatively, if a smart device 104 has additional available space, the radar system 102 can be designed to utilize smaller frequencies (e.g., frequencies less than 50 GHz), which can increase the footprint of the transmit electromagnetic vector sensor 212 and the receive electromagnetic vector sensor 214.

In the example implementations shown in FIGS. 5-1 to 5-5, the radar system 102 includes one transmit electromagnetic vector sensor 212 and one receive electromagnetic vector sensor 214. Other implementations of the radar system 102 can include multiple transmit electromagnetic vector sensors 212 and/or multiple receive electromagnetic vector sensors 214, as further described with respect to FIG. 6.

Figure 6:
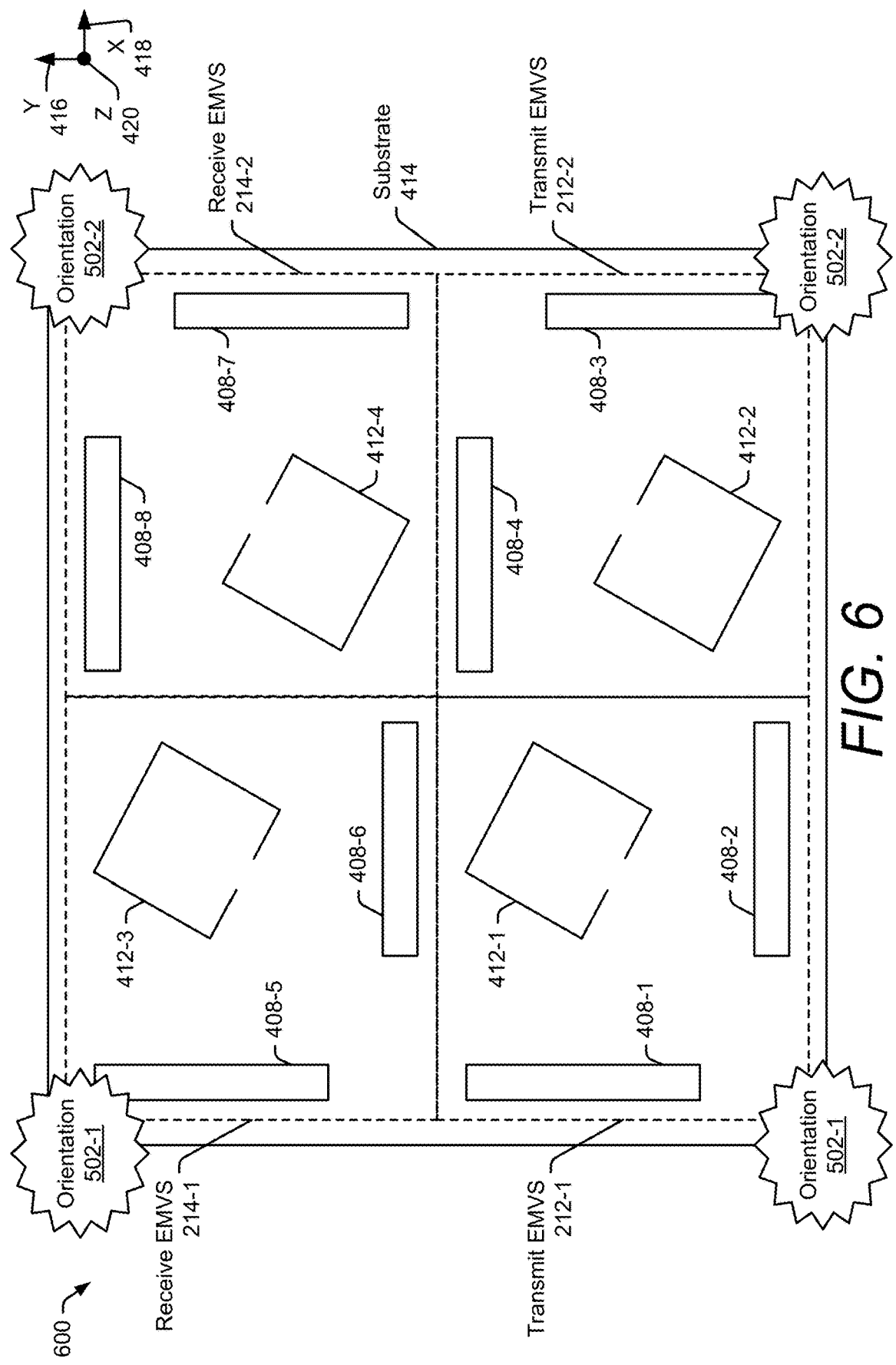
FIG. 6 illustrates example implementations of multiple transmit electromagnetic vector sensors and multiple receive electromagnetic vector sensors.

FIG. 6 illustrates example implementations of multiple transmit electromagnetic vector sensors 212-1 and 212-2 and multiple receive electromagnetic vector sensors 214-1 and 214-2. In the depicted configuration, the antennas 402 of the transmit electromagnetic vector sensor 212-1 are disposed on a first portion of the substrate 414 (e.g., a bottom-left portion of the substrate 414). The antennas 402 of the transmit electromagnetic vector sensor 212-2 are disposed on a second portion of the substrate 414 (e.g., a bottom-right portion of the substrate 414). The antennas 402 of the receive electromagnetic vector sensor 214-1 are disposed on a third portion of the substrate 414 (e.g., a top-left portion of the substrate 414). The antennas 402 of the receive electromagnetic vector sensor 214-2 are disposed on a fourth portion of the substrate 414 (e.g., a top-right portion of the substrate 414).

In this example, the transmit electromagnetic vector sensor 212-1 and the receive electromagnetic vector sensor 214-1 have the orientation 502-1. Also, the transmit electromagnetic vector sensor 212-2 and the receive electromagnetic vector sensor 214-2 have the orientation 502-2.

Figures 1, 7:
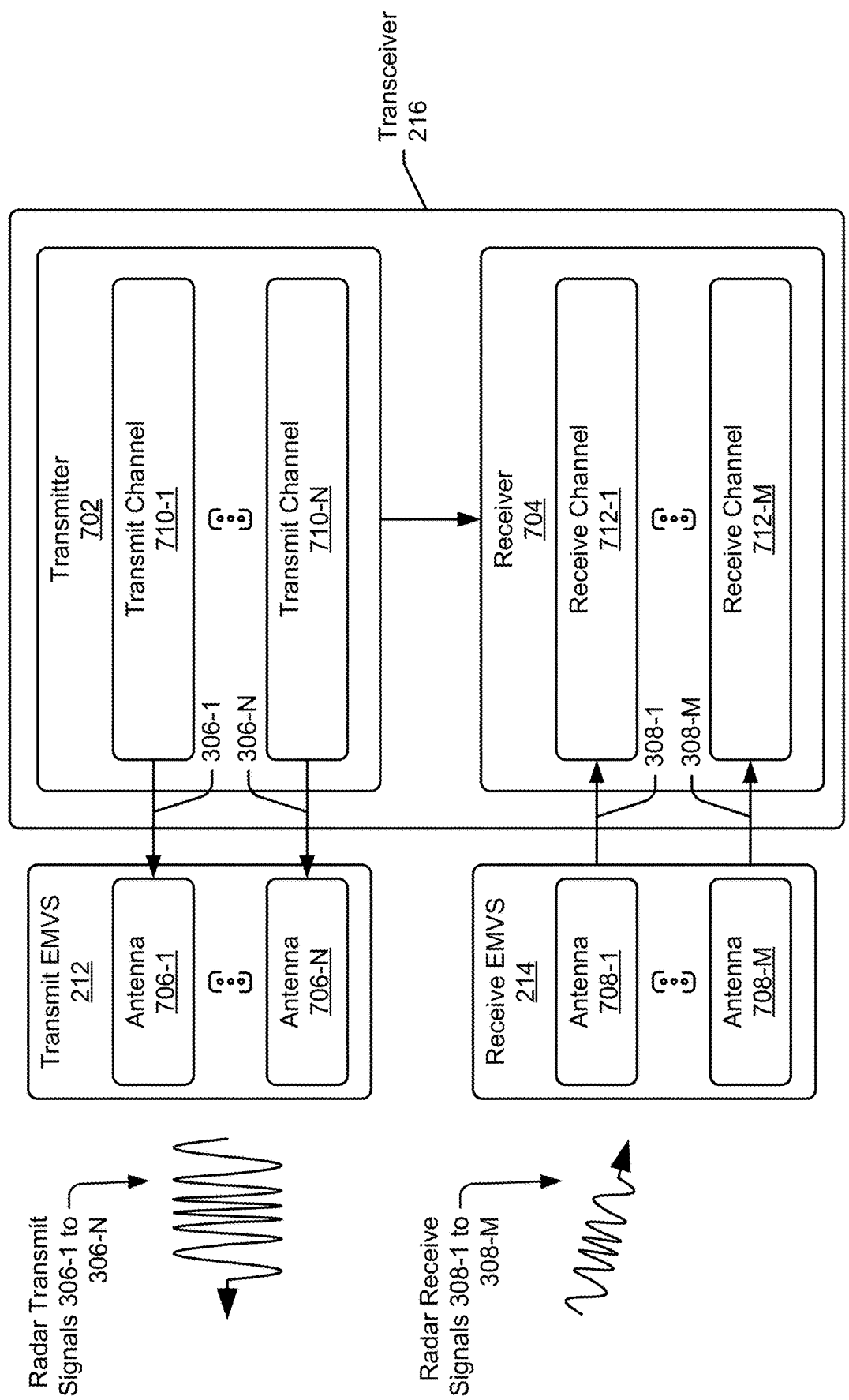
Figures 2, 7:
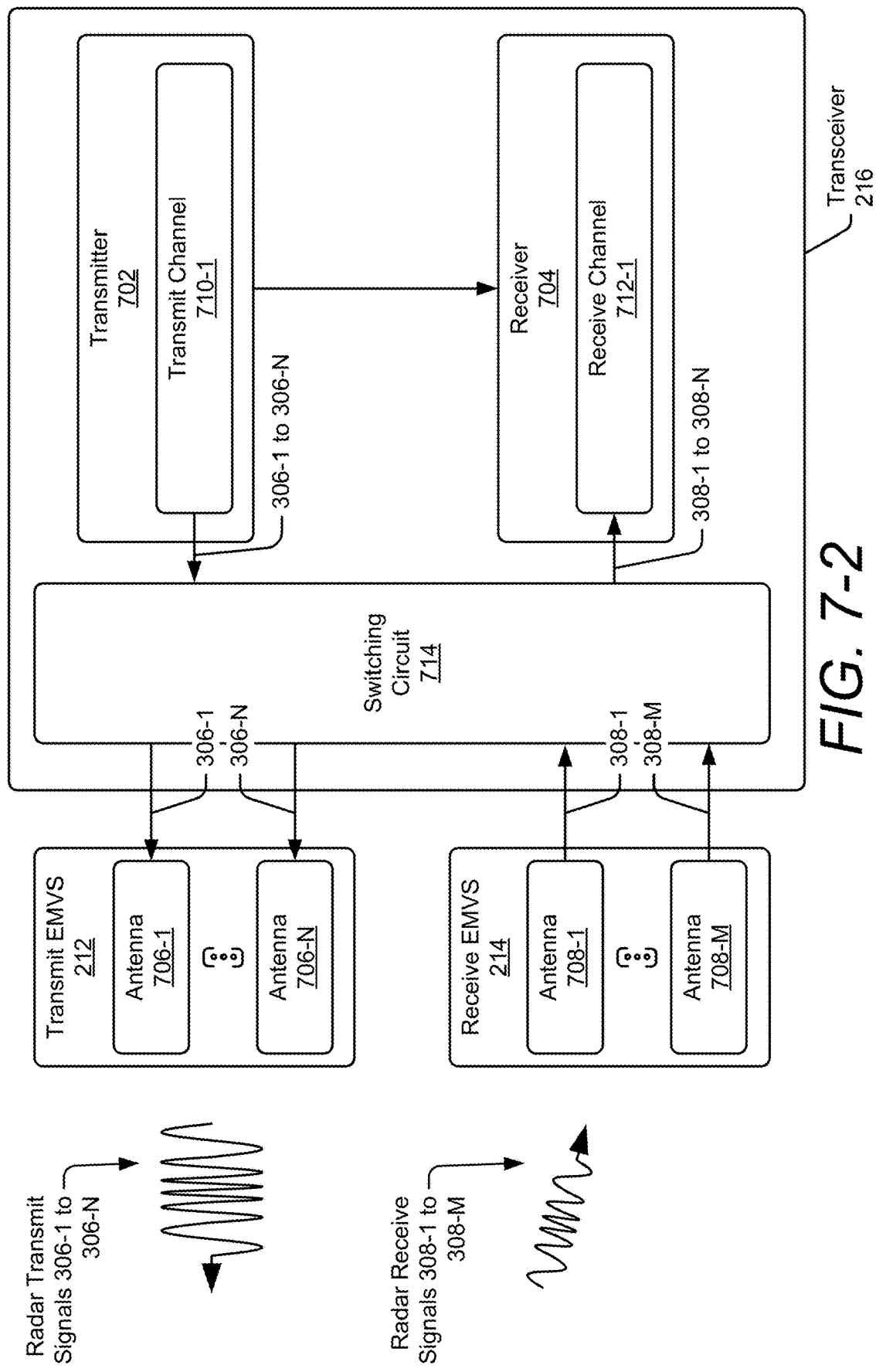

FIG. 7-1 illustrates an example implementation of the transceiver 216. In the depicted configuration, the transceiver 216 includes at least one transmitter 702 and at least one receiver 704. The transmitter 702 is coupled to the transmit electromagnetic vector sensor 212, and the receiver 704 is coupled to the receive electromagnetic vector sensor 214. The transmitter 702 is also coupled to the receiver 704. Although not explicitly shown, the transmitter 702 and/or the receiver 704 can be coupled to the system processor 218.

The transmit electromagnetic vector sensor 212 includes at least two antennas 706-1 to 706-N, where N represents a positive integer. The antennas 706-1 to 706-N can be implemented using the antennas 402-1 to 402-3 of FIG. 4-1. The receive electromagnetic vector sensor 214 includes at least three antennas 708-1 to 708-M, where M represents a positive integer. The antennas 708-1 to 708-M can be implemented using the antennas 402-1 to 402-3 of FIG. 4-1.

In this example implementation, the transmitter 702 includes at least two transmit channels 710-1 to 710-N. Each transmit channel 710-1 to 710-N can include components such as a voltage-controlled oscillator, a power amplifier, a phase shifter, a mixer, or some combination thereof. The transmit channels 706-1 to 706-N are respectively coupled to the antennas 706-1 to 706-N of the transmit electromagnetic vector sensor 212. For example, the transmit channel 710-1 is coupled to the antenna 706-1, and the transmit channel 710-N is coupled to the antenna 706-N.

The receiver 704 includes at least three receive channels 712-1 to 712-M. Each receive channel 712-1 to 712-M can include components such as a low-noise amplifier, a phase shifter, a mixer, a filter, and an analog-to-digital converter. The receive channels 712-1 to 712-M are respectively coupled to the antennas 708-1 to 708-M During transmission, the transmit channels 710-1 to 710-N generate respective radar transmit signals 306-1 to 306-N. The radar transmit signals 306-1 to 306-N have waveforms that can be similar or different. For example, the radar transmit signals 306-1 to 306-N can have similar or different frequencies, phases, amplitudes, or modulations. The antennas 706-1 to 706-N accept the radar transmit signals 306-1 to 306-N from the transmit channels 710-1 to 710-N and transmit the radar transmit signals 306-1 to 306-N. In various implementations, at least a portion of the radar transmit signals 306-1 to 306-N can be transmitted during a same time interval. Alternatively, the radar transmit signals 306-1 to 306-N can be transmitted during different time intervals.

During reception, each antenna 708-1 to 708-M receives a radar receive signal 308-1 to 308-M. Each of the radar receive signals 308-1 to 308-M can include a version of at least one of the radar transmit signals 306-1 to 306-N, which is reflected by an object (e.g., the user 302 of FIG. 3). The receive channels 712-1 to 712-M accept the radar receive signals 308-1 to 308-M from the antennas 708-1 to 708-M. The receive channels 712-1 to 712-M can perform operations such as amplification, phase shifting, filtering, down-conversion, demodulation, and analog-to-digital conversion. In general, the receive channels 712-1 to 712-M generate processed versions of the radar receive signals 308-1 to 308-M, which are provided to the electromagnetic-vector-sensor processing module 222.

In FIG. 7-1, each antenna 706-1 to 706-N of the transmit electromagnetic vector sensor 212 is coupled to a corresponding transmit channel 710-1 to 710-M. Likewise, each antenna 708-1 to 708-M of the receive electromagnetic vector sensor 214 is coupled to a corresponding receive channel 712-1 to 712-M. By having dedicated channels, the transmit electromagnetic vector sensor 212 can transmit multiple radar transmit signals 306-1 to 306-N during a first time interval and the receive electromagnetic vector sensor 214 can receive multiple radar receive signals 308-1 to 308-M during a second time interval. Other implementations of the radar system 102 can conserve space by implementing a transceiver 216 with fewer channels, an example of which is further described below with respect to FIG. 7-2.

FIG. 7-2 illustrates another example implementation of the transceiver 216. In the depicted configuration, the transmitter 702 of the transceiver 216 includes fewer transmit channels 710 than available antennas 706-1 to 706-N within the transmit electromagnetic vector sensor 212. In this case, the transmitter 702 includes one transmit channel 710-1. Additionally or alternatively, the receiver 704 of the transceiver 216 includes fewer receive channels 712 than available antennas 708-1 to 708-M within the receive electromagnetic vector sensor 214. In this case, the receiver 704 includes one receive channel 712-1.

The transceiver 216 also includes a switching circuit 714, which enables time sharing of the transmit channel 710-1 by the antennas 706-1 to 706-N and enables time sharing of the receive channel 712-1 by the antennas 708-1 to 708-M. The switching circuit 714 selectively connects the transmit channel 710-1 to different ones of the antennas 706-1 to 706-N. The switching circuit 714 also selectively connects the receive channel 712-1 to different ones of the antennas 708-1 to 708-M. In some implementations, the switching circuit 714 connects the receive channel 712-1 to different ones of the antennas 708-1 to 708-M while connecting the transmit channel 710-1 to one of the antennas 706-1 to 706-N.

Although the present teachings are not so limited, the implementations of FIGS. 5-1 to 6 provide several desirable advantageous characteristics. One such advantage is the ability to perform radar sensing using frequencies associated with millimeter wavelengths while having a footprint that integrates well into smartphones or portable consumer devices. With radar-sensing capabilities, these devices can support a wide variety of applications, including gesture recognition, presence detection, vital-sign monitoring, and/or collision avoidance. The frequencies associated with millimeter waves can include frequencies between approximately 50 and 70 GHz.

The compact design of the transmit electromagnetic vector sensor 212 and the receive electromagnetic vector sensor 214 can also enable the transceiver 216 and the antennas of the transmit electromagnetic vector sensor 212 and the receive electromagnetic vector sensor 214 to be implemented on a same integrated circuit. In some aspects, this can reduce power consumption in the smart device 104 and avoid complicated routing compared to other implementations that use multiple integrated circuits.

The multiple polarizations and antenna patterns of the transmit electromagnetic vector sensor 212 and the receive electromagnetic vector sensor 214 enable the radar system 102 to observe a sufficiently large field-of-view for a variety of radar-based applications without introducing significant cross-coupling interference. The techniques of applying electromagnetic vector sensors for radar sensing also enables the radar system 102 to avoid time-consuming aspects of beam steering or additional complexities associated with beamforming.

Example Method

Figure 8:
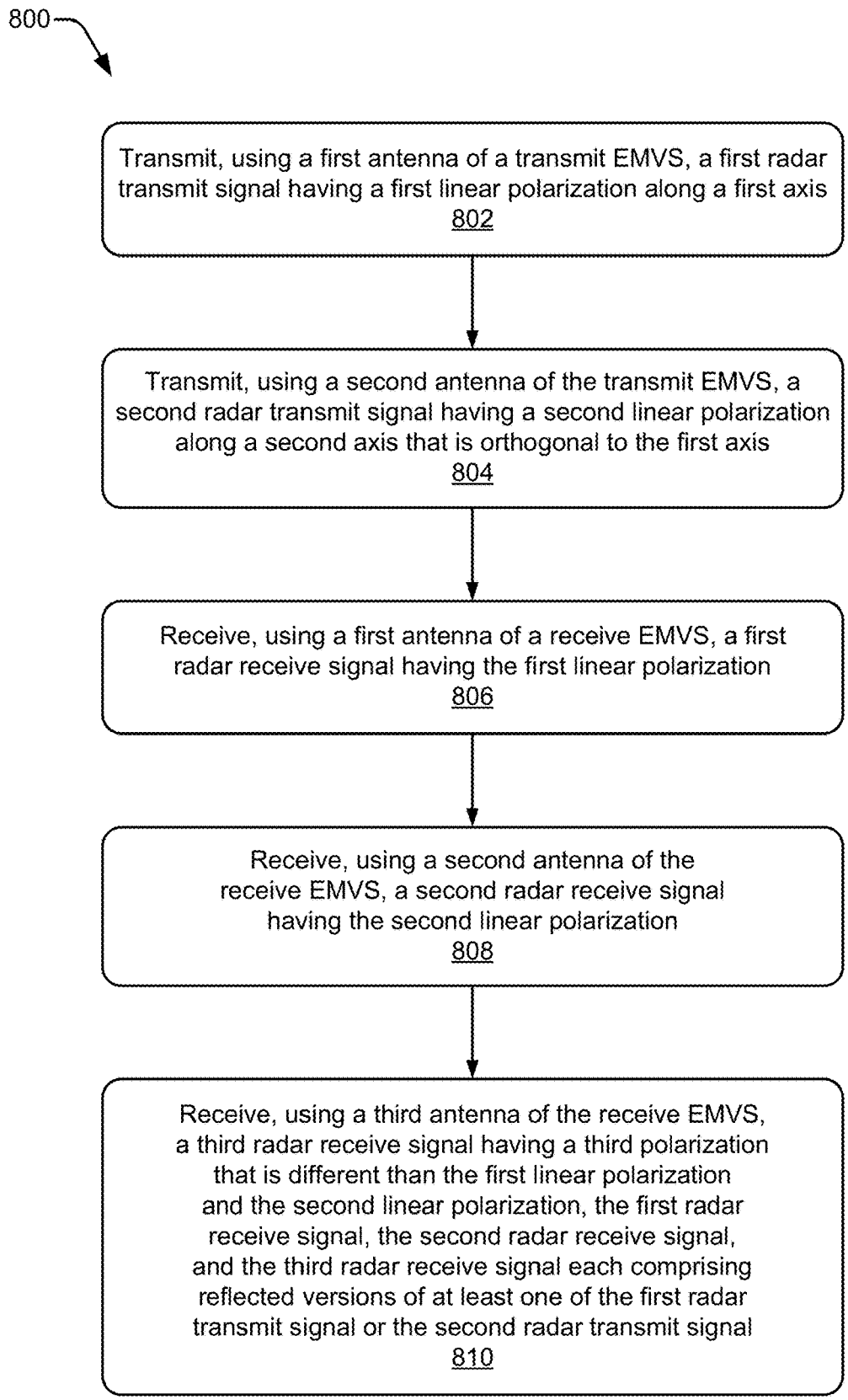
FIG. 8 illustrates an example method for performing operations of a radar system with a transmit electromagnetic vector sensor and a receive electromagnetic vector sensor.

FIG. 8 depicts an example method 800 for performing operations of electromagnetic vector sensors of a smart-device-based radar system. Method 800 is shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-6 of FIG. 1, and entities detailed in FIG. 2, reference to which is made for example only. The techniques are not limited to performance by one entity or multiple entities operating on one device.

At 802, a first radar transmit signal having a first linear polarization along a first axis is transmitted using a first antenna of a transmit electromagnetic vector sensor. For example, the antenna 402-1 of the transmit electromagnetic vector sensor 212 transmits a first radar transmit signal 306-1 having a linear polarization as the polarization 404-1. The polarization 404-1 can represent a vertical linear polarization, which is oriented along the vertical axis 416. The antenna 402-1 can be a linear strip antenna 408-1 or a dipole antenna 410-1.

At 804, a second radar transmit signal having a second linear polarization along a second axis that is orthogonal to the first axis is transmitted using a second antenna of the transmit electromagnetic vector sensor. For example, the antenna 402-2 of the transmit electromagnetic vector sensor 212 transmits a second radar transmit signal 306-2 having a linear polarization as the polarization 404-2. The polarization 404-2 can represent a horizontal linear polarization, which is oriented along the horizontal axis 418. The antenna 402-2 can be a linear strip antenna 408-2 or a dipole antenna 410-2.

At 806, a first radar receive signal having the first linear polarization is received using a first antenna of a receive electromagnetic vector sensor. For example, the antenna 402-1 of the receive electromagnetic vector sensor 214 receives a first radar receive signal 308-1 having the polarization 404-1. The antenna 402-1 can also be a linear strip antenna 408-1 or a dipole antenna 410-2.

At 808, a second radar receive signal having the second linear polarization is received using a second antenna of the receive electromagnetic vector sensor. For example, the antenna 402-2 of the receive electromagnetic vector sensor 214 receives a second radar receive signal 308-2 having the polarization 404-2. The antenna 402-2 can also be a linear strip antenna 408-1 or a dipole antenna 410-2.

At 810, a third radar receive signal having a third polarization that is different than the first linear polarization and the second linear polarization is received using a third antenna of the receive electromagnetic vector sensor. The first radar receive signal, the second radar receive signal, and the third radar receive signal each comprise reflected versions of at least one of the first radar transmit signal or the second radar transmit signal. For example, the antenna 402-3 of the receive electromagnetic vector sensor 214 receives a third radar receive signal 308-3 having the third polarization 404-3. The third polarization 404-3 can be a third linear polarization along a third axis (e.g., the Z axis 420) that is orthogonal to the vertical axis 416 and the horizontal axis 418. Alternatively, the third polarization 404-3 can be a circular polarization (e.g., a right-hand circular polarization or a left-hand circular polarization). The antenna 402-3 can be a loop antenna 412.

The first radar receive signal 308-1, the second radar receive signal 308-2, and the third radar receive signal 308-3 each comprise reflected versions of at least one of the first radar transmit signal 306-1 or the second radar transmit signal 306-2. For example, the first radar receive signal 308-1 can include portions of the first radar transmit signal 306-1 and/or portions of the second radar transmit signal 306-2 with the linear polarization 404-1. The second radar receive signal 308-2 can include portions of the first radar transmit signal 306-1 and/or portions of the second radar transmit signal 306-2 with the linear polarization 404-2. Also, the third radar receive signal 308-3 can include portions of the first radar transmit signal 306-1 and/or portions of the second radar transmit signal 306-2 with the third polarization 404-3.

Example Computing System

Figure 9:
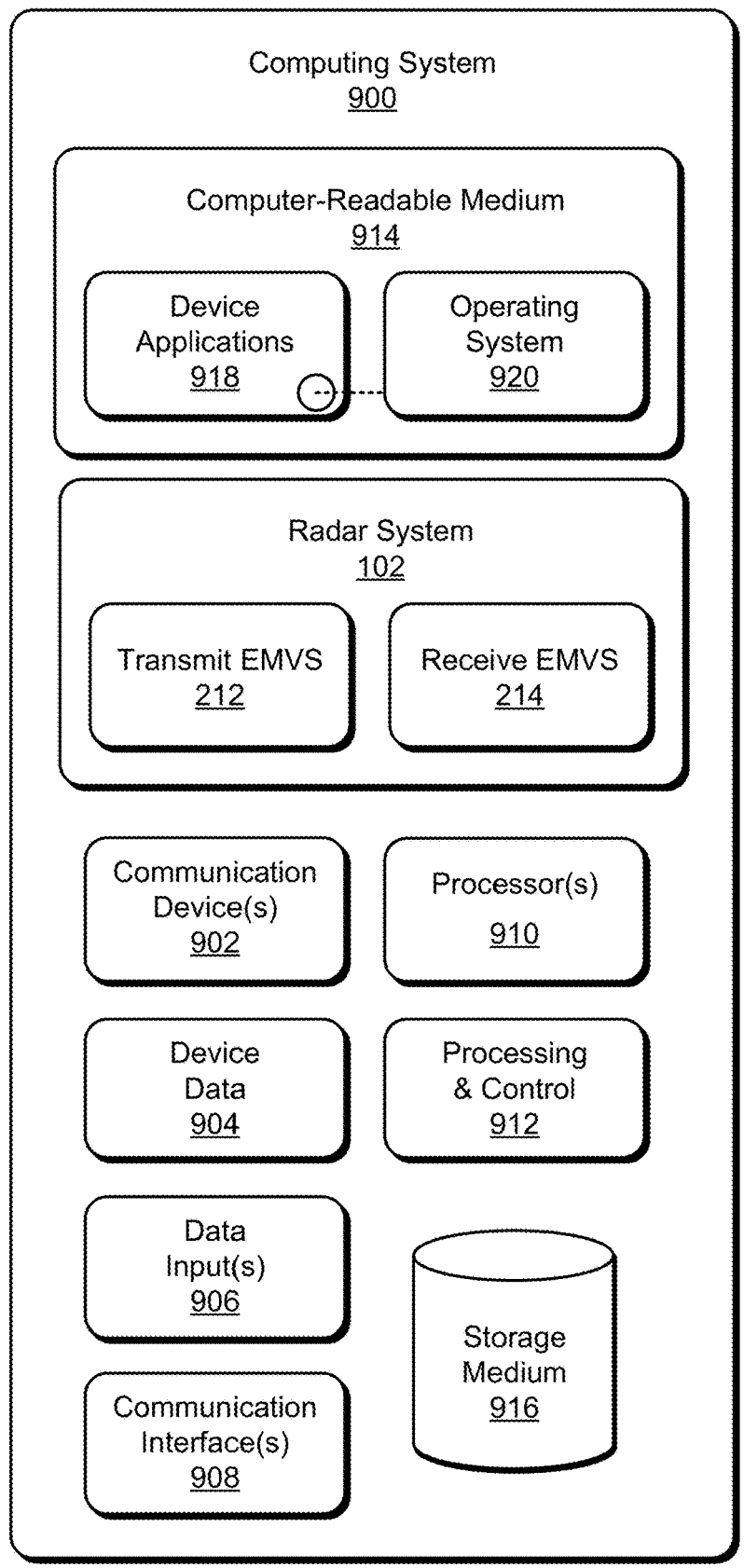
FIG. 9 illustrates an example computing system embodying, or in which techniques may be implemented that enable use of, electromagnetic vector sensors for a smart-device-based radar system.

FIG. 9 illustrates various components of an example computing system 900 that can be implemented as any type of client, server, and/or computing device as described with reference to the previous FIG. 2 to implement electromagnetic vector sensors for a smart-device-based radar system.

The computing system 900 includes communication devices 902 that enable wired and/or wireless communication of device data 904 (e.g., received data, data that is being received, data scheduled for broadcast, or data packets of the data). The communication devices 902 or the computing system 900 can include one or more radar systems 102. In this example, the radar system 102 includes the transmit electromagnetic vector sensor 212 and the receive electromagnetic vector sensor of FIGS. 4-1 to 5-4.

The device data 904 or other device content can include configuration settings of the device, media content stored on the device, and/or information associated with a user 302 of the device. Media content stored on the computing system 900 can include any type of audio, video, and/or image data. The computing system 900 includes one or more data inputs 906 via which any type of data, media content, and/or inputs can be received, such as human utterances, the radar-based application 206, user-selectable inputs (explicit or implicit), messages, music, television media content, recorded video content, and any other type of audio, video, and/or image data received from any content and/or data source.

The computing system 900 also includes communication interfaces 908, which can be implemented as any one or more of a serial and/or parallel interface, a wireless interface, any type of network interface, a modem, and as any other type of communication interface. The communication interfaces 908 provide a connection and/or communication links between the computing system 900 and a communication network by which other electronic, computing, and communication devices communicate data with the computing system 900.

The computing system 900 includes one or more processors 910 (e.g., any of microprocessors, controllers, and the like), which process various computer-executable instructions to control the operation of the computing system 900 and to enable techniques for, or in which can be embodied, gesture recognition in the presence of saturation. Alternatively or in addition, the computing system 900 can be implemented with any one or combination of hardware, firmware, or fixed logic circuitry that is implemented in connection with processing and control circuits which are generally identified at 912. Although not shown, the computing system 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 900 also includes a computer-readable media 914, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 900 can also include a mass storage media device (storage media) 916.

The computer-readable media 914 provides data storage mechanisms to store the device data 904, as well as various device applications 918 and any other types of information and/or data related to operational aspects of the computing system 900. For example, an operating system 920 can be maintained as a computer application with the computer-readable media 914 and executed on the processors 910. The device applications 918 may include a device manager, such as any form of a control application, software application, signal-processing and control module, code that is native to a particular device, a hardware abstraction layer for a particular device, and so on. The device applications 918 also include any system components, engines, or managers to perform radar sensing using electromagnetic vector sensors.

CONCLUSION

Although techniques using, and apparatuses including, electromagnetic vector sensors for a smart-device-based radar system have been described in language specific to features and/or methods, it is to be understood that the subject of the appended claims is not necessarily limited to the specific features or methods described. Rather, the specific features and methods are disclosed as example implementations of electromagnetic vector sensors for a smart-device-based radar system.

The invention claimed is:

1. A radar system for a smart device, the radar system comprising:
 a transmit electromagnetic vector sensor comprising:
  two coplanar linear strip antennas comprising:
   a first horizontal antenna configured to have a first linear polarization along a first axis; and
   a first vertical antenna configured to have a second linear polarization along a second axis that is orthogonal to the first axis;
 a receive electromagnetic vector sensor comprising:
  two other coplanar linear strip antennas comprising:
   a second horizontal antenna configured to have the first linear polarization along the first axis; and
   a second vertical antenna configured to have the second linear polarization along the second axis; and
  a loop antenna configured to have a third polarization that is different than the first linear polarization and the second linear polarization, wherein:
   the loop antenna is positioned between the first vertical antenna and the second vertical antenna such that a third axis that is parallel to the first axis intersects the loop antenna, the first vertical antenna, and the second vertical antenna; and
   the loop antenna is positioned between the first horizontal antenna and the second horizontal antenna such that a fourth axis that is parallel to the second axis intersects the loop antenna, the first horizontal antenna, and the second horizontal antenna.

2. The radar system of claim 1, wherein the third polarization comprises a third linear polarization along a third axis that is orthogonal to the first axis and the second axis.

3. The radar system of claim 1, wherein the third polarization comprises a circular polarization.

4. The radar system of claim 1, wherein:
 the loop antenna is a second loop antenna; and
 the transmit electromagnetic vector sensor comprises a first loop antenna configured to have a fourth polarization.

5. The radar system of claim 4, wherein the third polarization of the second loop antenna and the fourth polarization of the first loop antenna are a same circular polarization.

6. The radar system of claim 1, wherein the two coplanar linear strip antennas of the transmit electromagnetic vector sensor and the two other coplanar linear strip antennas of the receive electromagnetic vector sensor comprise dipole antennas.

7. The radar system of claim 1, wherein the loop antenna comprises a C-shaped conductor.

8. The radar system of claim 7, wherein the C-shaped conductor has:
 a first side that is oriented at approximately a 45 degree angle relative to the first horizontal antenna; and
 a second side that is adjacent to the first side and is oriented at approximately a 45 degree angle relative to the first vertical antenna.

9. The radar system of claim 1, wherein the transmit electromagnetic vector sensor and the receive electromagnetic vector sensor are implemented on a substrate.

10. The radar system of claim 1, wherein the two coplanar linear strip antennas of the transmit electromagnetic vector sensor, the other coplanar linear strip antennas of the receive electromagnetic vector sensor, and the loop antenna of the receive electromagnetic vector sensor are disposed in a common plane.

11. The radar system of claim 1, wherein:
 a distance between the first vertical antenna and the second vertical antenna relative to the first axis is approximately three millimeters; and
 a distance between the first horizontal antenna and the second horizontal antenna relative to the second axis is approximately three millimeters.

12. The radar system of claim 1, further comprising:
 two transmit channels respectively coupled to the two coplanar linear strip antennas of the transmit electromagnetic vector sensor; and
 three receive channels respectively coupled to the two other coplanar linear strip antennas and the loop antenna of the receive electromagnetic vector sensor.

13. The radar system of claim 1, further comprising:
 a transmit channel;
 a receive channel; and
 a switching circuit coupled to the transmit channel, the receive channel, the transmit electromagnetic vector sensor, and the receive electromagnetic vector sensor, the switching circuit configured to:
  selectively connect the transmit channel to different antennas of the transmit electromagnetic vector sensor, the different antennas of the transmit electromagnetic vector sensor comprising the two coplanar linear strip antennas; and
  selectively connect the receive channel to different antennas of the receive electromagnetic vector sensor, the different antennas of the receive electromagnetic vector sensor comprising the two other coplanar linear strip antennas and the loop antenna.

14. The radar system of claim 1, wherein:
 a dimension of the loop antenna along the first axis is less than or equal to a distance between the first vertical antenna and the second vertical antenna; and
 a dimension of the loop antenna along the second axis is less than or equal to a distance between the first horizontal antenna and the second horizontal antenna.

15. The radar system of claim 1, wherein the loop antenna is positioned within a region having:
 two borders respectively defined by outer edges of the first and second vertical antennas; and
 another two borders respectively defined by outer edges of the first and second horizontal antennas.

16. A method of operating a radar system with a transmit electromagnetic vector sensor and a receive electromagnetic vector sensor, the method comprising:
 transmitting, using a first horizontal antenna of the transmit electromagnetic vector sensor, a first radar transmit signal having a first linear polarization along a first axis;
 transmitting, using a first vertical antenna of the transmit electromagnetic vector sensor, a second radar transmit signal having a second linear polarization along a second axis that is orthogonal to the first axis;
 receiving, using a second horizontal antenna of the receive electromagnetic vector sensor, a first radar receive signal having the first linear polarization;
 receiving, using a second vertical antenna of the receive electromagnetic vector sensor, a second radar receive signal having the second linear polarization; and
 receiving, using a loop antenna of the receive electromagnetic vector sensor, a third radar receive signal having a third linear polarization that is different than the first linear polarization and the second linear polarization, the first radar receive signal, the second radar receive signal, and the third radar receive signal each comprising reflected versions of at least one of the first radar transmit signal or the second radar transmit signal, wherein:

the loop antenna is positioned between the first vertical antenna and the second vertical antenna such that a third axis that is parallel to the first axis intersects the loop antenna, the first vertical antenna, and the second vertical antenna; and the loop antenna is positioned between the first horizontal antenna and the second horizontal antenna such that a fourth axis that is parallel to the second axis intersects the loop antenna, the first horizontal antenna, and the second horizontal antenna.

17. The method of claim 16, further comprising:

transmitting, using a second loop antenna of the transmit electromagnetic vector sensor, a third radar transmit signal having the third polarization, wherein the first radar receive signal, the second radar receive signal, and the third radar receive signal each comprise reflected versions of at least one of the first radar transmit signal, the second radar transmit signal, or the third radar transmit signal.

18. The method of claim 17, further comprising:

transmitting a portion of the first radar transmit signal and a portion of the second radar transmit signal during a time interval; and receiving the first radar receive signal, the second radar receive signal, and the third radar receive signal during another time interval.

19. The method of claim 17, further comprising:

transmitting the first radar transmit signal and the second radar transmit signal during different time intervals; and switching between receiving the first radar receive signal, receiving the second radar receive signal, and receiving the third radar receive signal during each of the different time intervals.

20. The radar system of claim 14, wherein:

the dimension of the loop antenna along the first axis is less than or equal to a length of the first horizontal antenna; and the dimension of the loop antenna along the second axis is less than or equal to a length of the first vertical antenna.

* * * * *